US011615006B2

(12) United States Patent
Babineau et al.

(10) Patent No.: US 11,615,006 B2
(45) Date of Patent: Mar. 28, 2023

(54) VIRTUAL NETWORK LIFE CYCLE MANAGEMENT

(71) Applicant: Cisco Technology, Inc., San Jose, CA (US)

(72) Inventors: David Babineau, Ottawa (CA); Deng Liao, Ottawa (CA); Michael Yeung, Manotick (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/459,794

(22) Filed: Aug. 27, 2021

(65) Prior Publication Data
US 2023/0061749 A1  Mar. 2, 2023

(51) Int. Cl.
*G06F 11/00* (2006.01)
*G06F 11/20* (2006.01)

(52) U.S. Cl.
CPC .... *G06F 11/2028* (2013.01); *G06F 2201/805* (2013.01)

(58) Field of Classification Search
CPC .......................... G06F 11/2023; G06F 11/2028
See application file for complete search history.

(56) References Cited

U.S. PATENT DOCUMENTS

| 9,645,899 | B1 * | 5/2017 | Felstaine ................. H04L 43/10 |
| 10,764,118 | B1 * | 9/2020 | Melkild ............... G06F 9/45558 |
| 11,095,543 | B1 * | 8/2021 | Iglesias .................... H04L 41/40 |
| 2017/0116020 | A1 * | 4/2017 | Miller .................. H04L 41/0896 |
| 2018/0191838 | A1 * | 7/2018 | Friedman ............ H04L 41/0895 |
| 2018/0295067 | A1 | 10/2018 | Xia et al. |
| 2019/0056975 | A1 | 2/2019 | Yu et al. |
| 2019/0132211 | A1 | 5/2019 | Yeung et al. |

FOREIGN PATENT DOCUMENTS

| WO | WO-2016071736 A1 * | 5/2016 | ......... H04L 67/1002 |
| WO | WO2017177042 A1 | 10/2017 | |
| WO | WO2020177564 A1 | 9/2020 | |

* cited by examiner

*Primary Examiner* — Michael Maskulinski
(74) *Attorney, Agent, or Firm* — Lee & Hayes, P.C.

(57) ABSTRACT

This disclosure describes lifecycle management (LCM) techniques for improving high availability (HA) and scalability in a virtual network. The techniques include empowering virtual network function managers (VNFMs) to provide LCM to other VNFMs in the virtual network. For example, a VNFM instance in the virtual network may autonomously update and/or improve the virtual network design, such as by deploying additional VNFM instances. A VNFM network may be able to self-organize, such as by designating a primary cluster and/or autonomously holding an election. A VNFM instance may also heal and/or redeploy another VNFM instance. The present virtual network LCM techniques may allow a virtual network to be self-sustaining while providing HA.

20 Claims, 15 Drawing Sheets

VIRTUAL NETWORK LIFE CYCLE MANAGEMENT

TECHNICAL FIELD

The present disclosure relates generally to life cycle management of virtual network components to improve availability and scalability of a virtual network, thereby improving operation and performance of the virtual network.

BACKGROUND

A computer network is a geographically distributed collection of nodes interconnected by communication links and segments for transporting data between nodes (devices). Network environments are growing in complexity and scale to handle the ever-increasing demands on computer systems in the modern world. Cloud computing often involves the use of networks of data centers which house servers, routers, and other devices that provide computing resources to users such as computing resources, networking resources, storage resources, database resources, application resources, and so forth. Users may be allocated portions of the computing resources using virtualization technology that remain available for peak demands of the users. The virtualized portions, or virtualized networks, of computing resources may be scaled up (or down) according to the computing needs of a given user without the need to maintain excess computing capacity. Management of the flexible, virtualized networks may be performed by software-defined networking. However, as virtual networks grow larger and more complex, design and management of a virtual network may grow more cumbersome. For instance, if there is a failure in one data center of a virtual network, threatening an interruption in service, overcoming the failure may require redeployment of elements of the virtual network and/or redesign of the virtual network to continue providing the service.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, letters and/or parentheticals are utilized after a reference number to distinguish like elements. Use of the reference number without the associated letter or parenthetical is generic to the element. The systems depicted in the accompanying figures are not to scale and components within the figures may be depicted not to scale with each other.

DESCRIPTION OF EXAMPLE EMBODIMENTS

Overview

Figure 1A:
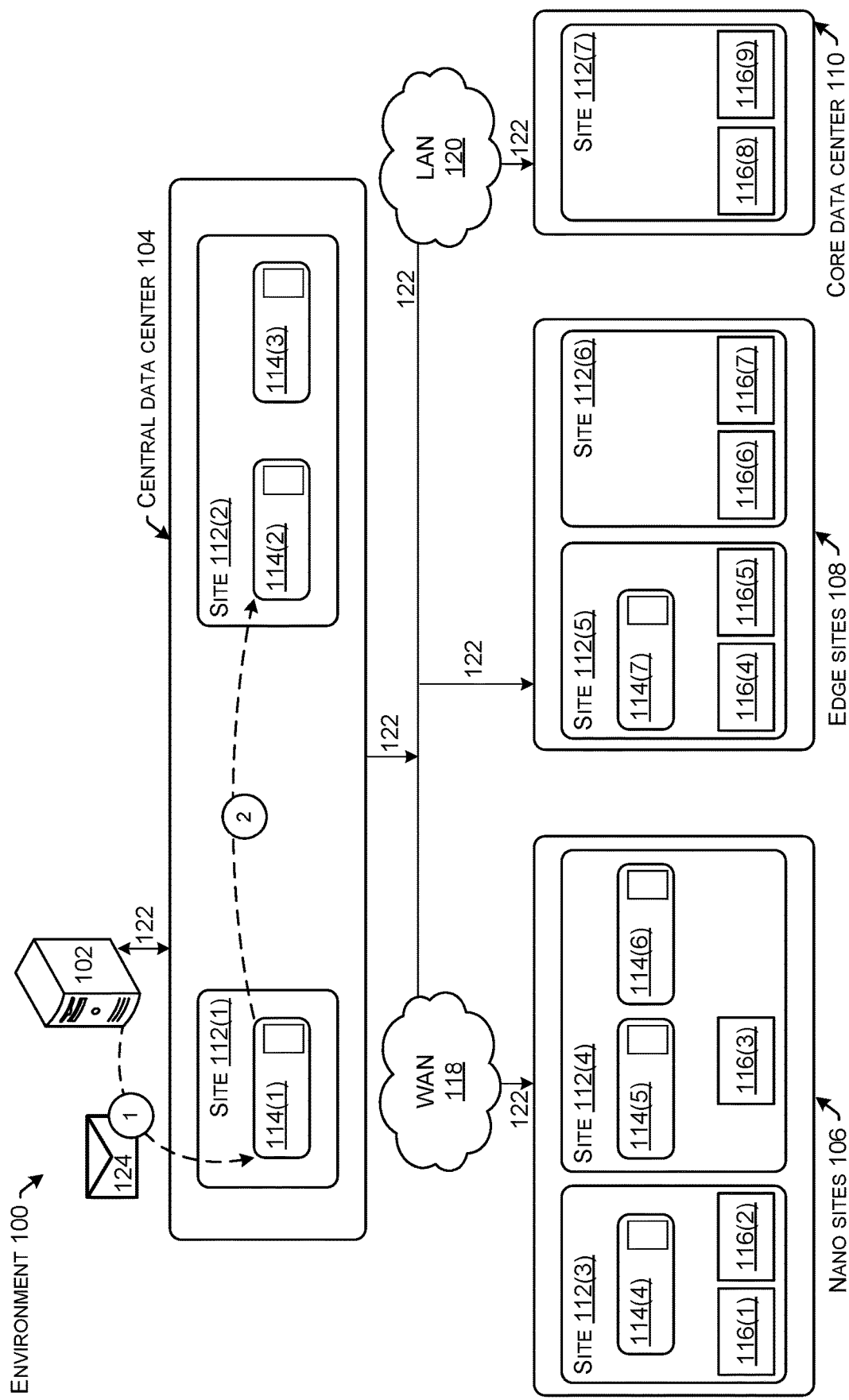
FIGS. 1A-1C, 3A, 3B, 5A, and 5B illustrate component diagrams with example environments in which virtual network life cycle management (LCM) techniques may be employed as part of communications between network and/or virtual devices, in accordance with the present concepts.

This disclosure describes, at least in part, a method that may be implemented by a virtual computing device communicatively coupled to other computing resources. The method may include designating a first virtual network function manager (VNFM) instance as a primary cluster. The first VNFM instance may be running on a first site. The method may include monitoring health of the primary cluster. Based at least in part on the monitoring, the method may include determining that the primary cluster has failed. Based at least in part on the determining, the method may include designating a second VNFM instance as a new primary cluster. The second VNFM instance may be running on a second site, in some examples. Based at least in part on the determining, the method may also include designating a third VNFM instance as a new secondary cluster. The third VNFM instance may be running on a third site. Additionally or alternatively, based at least in part on the determining, the method may also include redeploying the first VNFM instance on the first site as a new secondary cluster.

This disclosure also describes, at least in part, a method that may be implemented by a virtual computing device communicatively coupled to other computing resources. The method may include designating a VNFM instance as a primary cluster. The first VNFM instance may be running on a first site. The method may include monitoring health of the primary cluster. Based at least in part on the monitoring, the method may include determining that the primary cluster has failed. Based at least in part on the determining, the method may include electing a second VNFM instance as a new primary cluster. In some examples, the second VNFM instance may be running on a second site. The method may further include redeploying the first VNFM instance on the first site as a new secondary cluster.

Additionally, the techniques described herein may be performed by a system and/or device having non-transitory computer-readable media storing computer-executable instructions that, when executed by one or more processors, performs the methods described above.

Example Embodiments

This disclosure describes lifecycle management (LCM) techniques for improving high availability (HA) and scalability in a virtual network. More specifically, the techniques include empowering virtual network function managers (VNFMs) to provide LCM to other VNFMs in the virtual network. For example, a VNFM in the virtual network may autonomously update and/or improve the virtual network design, such as deploying additional VNFMs, creating backup VNFM instances to better handle failures, taking action when a VNFM fails, etc. In some implementations, the present LCM techniques may be described as allowing a self-organizing, dynamic cluster of VNFM instances which turn VNF management functionality inwards towards the VNFMs to achieve HA and/or scalability. Therefore, the present LCM techniques can provide a dynamic, flexible environment to improve management and operation of the virtual network.

Traditionally, one management method has been used to manage VNFM instances and/or virtual network orchestration software, such as installation by a network manager (e.g., user, operator) of a number of VNFM instances (e.g., a VNFM network) on virtual machines according to a desired virtual network design. Note that user involvement may have been needed to design/scale the virtual network and/or respond to a VNFM failure. For instance, a user may have been involved with installation of each of the VNFM instances for any given virtual network design, and potentially involved again and again as new deployment, redeployment, and/or repair of VNFM instances was warranted. Meanwhile, a different management method has been used to handle ongoing operations of the virtual network function/cloud-native network function (VNF/CNF) software. For instance, once installation of a VNFM network is completed, the VNFM network may be capable of autonomously applying LCM to the VNF/CNF software, including healing and scaling, etc. (e.g., Kubernetes). With the present LCM techniques, management of both VNFM installation and ongoing management of VNF/CNF software may be accomplished with a single method, via the empowerment of the VNFMs to self-organize. Stated another way, a user may be involved with installation of a single, initial VNFM instance on a virtual machine, and the initial VNFM instance may move forward with building out the virtual network without further input from the user. Furthermore, the VNFMs of the virtual network may then monitor and/or manage the ongoing operation of the virtual network, including dynamically adjusting the virtual network design in response to failures, policy changes, or other events, for instance.

Consider, for example, a virtual network of 10 data centers providing service to a customer. At one data center, there may be three VNFM instances. (As used herein, a VNFM may comprise an elastic service controller (ESC), for example.) If one of the VNFM instances at the data center fails, another of the three VNFM instances may be able to provide LCM for the VNF software. However, another of the 10 data centers may also have three instances of VNFMs acting as a backup for the first data center. Furthermore, any of the 10 data centers may have additional instances of the VNFMs available as backup. The VNFM instances may each be capable of providing LCM to both the VNF software, but also to the VNFM network itself. Therefore, the present LCM techniques help provide a self-sustaining, multi-data center environment, including valuable redundancy to protect against failures.

In the above example, using traditional methods for installation of all of the VNFM instances across the 10 data centers, operational planning to work through all of the multi-data center infrastructure, and then redesigning/rebuilding if any data center needs to be repaired or updated could be prohibitive in terms of user involvement. For instance, typically user involvement is required to install or repair a failed VNFM instance. In contrast, with the present LCM techniques, a user may install a first VNFM instance, then the first VNFM instance may initialize installation of other VNFM instances, throughout the 10 data centers in this example. The first VNFM may be given performance parameters for the virtual network, such as one or more policies to satisfy (e.g., resource allocation, how quickly the virtual network recovers, preferred architecture, etc.). The first VNFM may spin out all the infrastructure for the multi-data center environment to satisfy the policy. For instance, the first VNFM instance may trigger a cascade of VNFM deployments through the other data centers. The VNFM network may then handle updates or changes automatically, including policy updates, failures, etc. Therefore, the VNFM network may be viewed as self-designing, self-monitoring, self-healing, and generally self-sustaining. As such, user involvement may be limited to the initial installation of the first VNFM instance and supplying a policy and/or a policy update. Note that the VNFM network may also query the user regarding changes or choices, and/or the user may otherwise provide additional input from time to time.

In some implementations, a VNFM instance may simply be representative of a set of libraries or capabilities. Therefore, any set of libraries may be empowered to self-replicate, self-monitor, and/or self-heal. As such, the LCM techniques described herein could be applied to any of a wide variety of applications. The disclosed LCM techniques may be useful in a variety of multi-data center and/or edge computing scenarios. For instance, the disclosed HA mechanisms involving data replication, holding an election, etc., may be applied to other forms of software beyond VNFM.

To summarize, an initial VNFM instance may be installed on a virtual machine and provided with a policy describing parameters and/or predetermined topology choices for a virtual network. The initial VNFM software instance may spin out a network of additional VNFM instances, helping to build a virtual network that satisfies the policy. The VNFM network may then also monitor metrics and/or events regarding operation of the virtual network, evaluating whether the metrics are meeting the policy, and determine action to take when the policy is not being met, for instance. Various examples of potential actions taken by the VNFM network will be described in detail below. Automating LCM for VNFMs can improve overall orchestration performance, stability, and efficiency, particularly in larger, more complex computing environments.

Although the examples described herein may refer to a VNFM and/or other virtual network resources, the techniques can generally be applied to any device in a network. Further, the techniques are generally applicable for any network of devices managed by any entity where virtual resources are provisioned. In some instances, the techniques may be performed by software-defined networking (SDN), and in other examples, various devices may be used in a system to perform the techniques described herein. The devices by which the techniques are performed herein are a matter of implementation, and the techniques described are not limited to any specific architecture or implementation.

The techniques described herein provide various improvements and efficiencies with respect to network communications. For instance, the techniques described herein may reduce the amount of computational resource use, user involvement, storage, dropped data, latency, and other issues experienced in networks due to lack of network resources, overuse of network resources, issues with timing of network communications, and/or improper routing of data. By improving network communications across a network, overall performance by servers and virtual resources may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

Figure 1B:
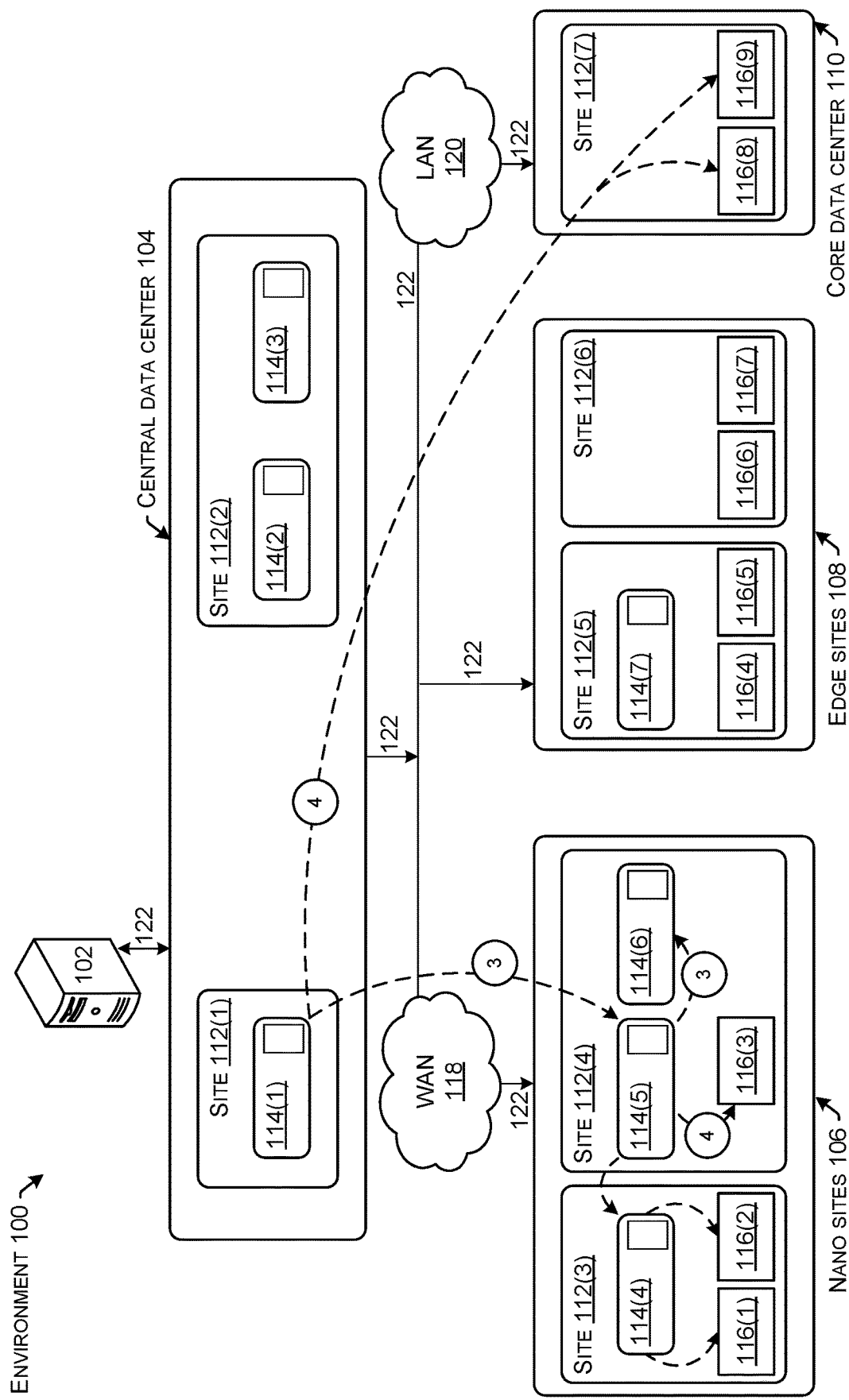
Figure 1C:
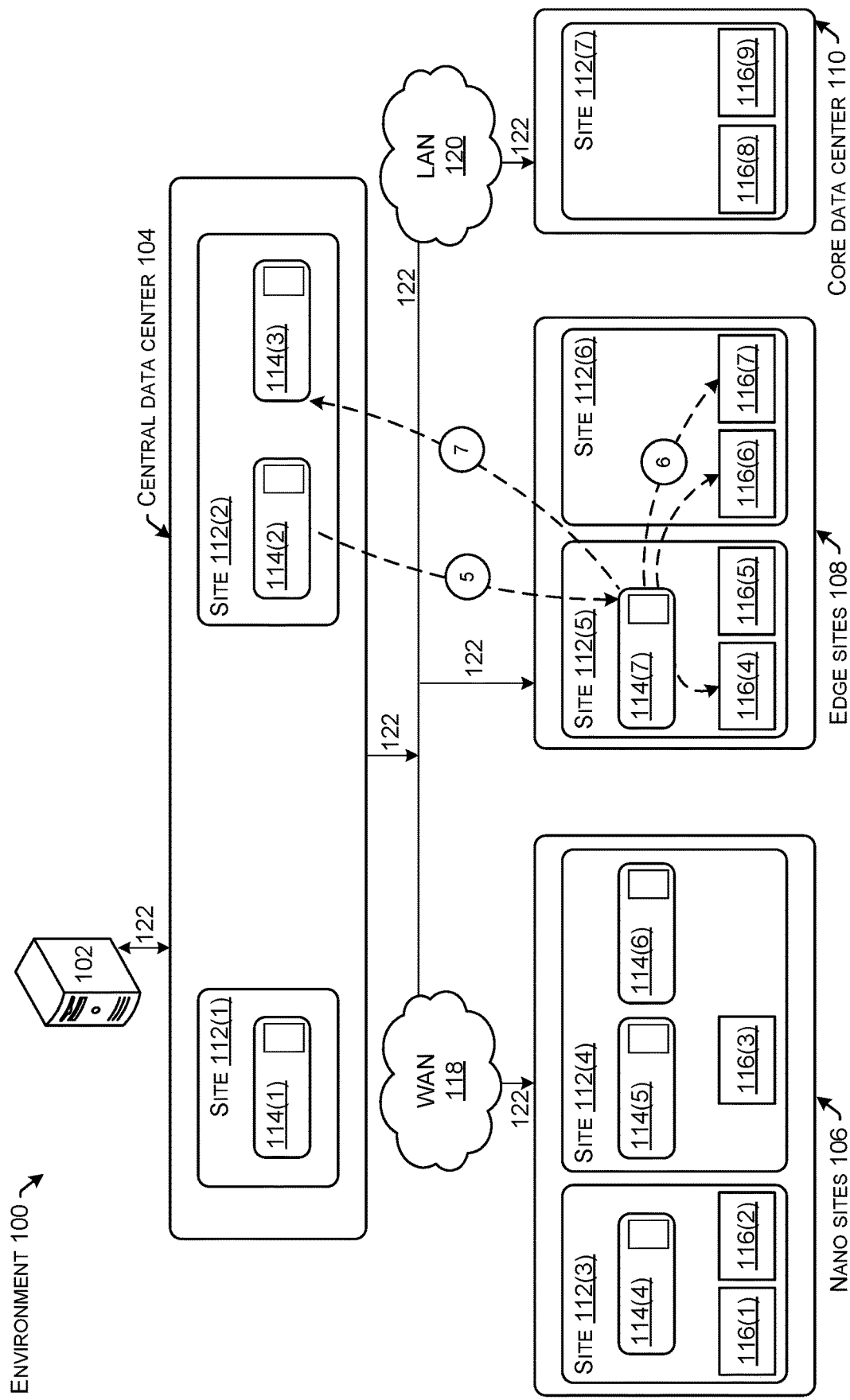

FIGS. 1A-1C collectively illustrate an example environment 100 in accordance with the present virtual network LCM concepts. Example environment 100 may include a user device 102, which may be associated with a user (e.g., operator, administrator, network service orchestrator, etc.). Environment 100 also includes various elements that may be viewed as belonging to a virtual network, including a central data center 104, nano sites 106, edge sites 108, and/or a core data center 110. As shown in FIGS. 1A-1C, the elements of the virtual network may include one or more sites 112 (e.g., geographical locations, cloud computing sites). The sites 112 may include one of more VNFM instances 114, and/or VNF instances 116. More specifically, the VNFM instances 114 and/or VNF instances 116 may be viewed as instances of software instantiated on a virtual machine (e.g., computing device) at a site 112. The occurrence, number, and/or arrangement of elements of the virtual network depicted in the example in FIGS. 1A-1C is not meant to be limiting. Any of a variety of types of data centers, sites, or other elements are contemplated for housing virtual machines and/or instances of VNFMs and/or VNF/CNF software. The use of a parenthetical after a reference number is intended to distinguish like elements. Use of the reference number without the associated letter is generic to the element. For instance, seven VNFM instances 114 are depicted in FIGS. 1A-1C, including VNFM instance 114(1) at site 112(1), VNFM instance 114(2) at site 112(2), VNFM instance 114(3) at site 112(2), and so forth.

The elements of the virtual network in example environment 100 may be connected by one or more networks, such as wide area network (WAN) 118 and/or local area network (LAN) 120. Within the example environment 100, user device 102, the virtual machines at sites 112 that hold the VNFM instances 114 and/or VNF instances 116, and/or other devices may exchange communications (e.g., packets) via a network connection(s), some examples of which are indicated by arrows 122. Not all potential networks and/or network connections are shown in FIG. 1A-1C to avoid clutter on the drawing pages. The network connections 122 may be transport control protocol (TCP) network connections or any network connection (e.g., information-centric networking (ICN)) that enables a user device 102 or virtual machine to exchange packets with other computing devices via a network, such as WAN 118 and/or LAN 120. The network connections 122 represent, for example, data paths between virtual machines at sites 112. It should be appreciated that the term "network connection" may also be referred to as a "network path." The use of a WAN or LAN in this example is not meant to be limiting. Other types of networks are contemplated in accordance with virtual network LCM concepts.

In FIGS. 1A-1C, numbered circles and/or dashed arrows are used to represent Steps 1-4 of an example virtual network LCM scenario. The example scenario depicted in FIGS. 1A-1C includes installation of a network of VNFM instances 114 across multiple sites 112 in accordance with the present virtual network LCM concepts.

In Step 1 of FIG. 1A, at user at user device 102 interacts with site 112(1) by installing a VNFM instance 114(1). Since this is the first VNFM instance 114 installed in this scenario, VNFM instance 114(1) may be considered a VNFM Primary Cluster instance. For installation of VNFM instance 114(1), the user may use virtual infrastructure manager (VIM) software, for instance. Step 1 may also include delivery of a policy 124 from user device 102 to VNFM instance 114(1), such as a policy 124 describing a desired virtual network parameter. In some examples, policy 124 may represent one or more policies regarding performance of an individual VNFM instance 114, the VNFM network in general (e.g., multiple VNFM instances 114), an individual VNF instance 116, the VNF network in general (e.g., multiple VNF instances 116), etc.

In Step 2 of FIG. 1A, VNFM instance 114(1) installs VNFM instance 114(2) at site 112(2). In this scenario, VNFM instance 114(2) may be considered a VNFM Secondary Cluster instance. VNFM instance 114(1) may determine to install VNFM instance 114(2) based on the policy 124 received from user device 102. For instance, the policy 124 may be satisfied at least in part by arranging a backup of the VNFM Primary Cluster instance in the form of the VNFM Secondary Cluster instance.

Furthermore, Step 2 may include ongoing monitoring between VNFM instance 114(1) and VNFM instance 114(2). The ongoing monitoring may include collection and/or review of health metrics, performance metrics, events, and/or other information. The information may be evaluated to determine whether the VNFM instances 114 and/or the virtual network is meeting and/or is expected to meet the policy 124. Based at least in part on the evaluation, VNFM instance 114(1) or VNFM instance 114(2) may determine an action to take when policy 124 is not being met. For example, VNFM instance 114(1) may determine that additional VNFM instances 114 are warranted. In another example, VNFM instance 114(2) may detect a failure at VNFM instance 114(1), and may attempt to repair VNFM instance 114(1), redeploy VNFM instance 114(1), and/or initiate an election that may select VNFM instance 114(2) as a new VNFM Primary Cluster instance. More detail regarding these actions will be described below.

In Step 3 of FIG. 1B, VNFM instance 114(1) may continue to build out the VNFM network. For example, VNFM instance 114(1) may install VNFM instance 114(5) at site 112(4). In turn, VNFM instance 114(5) may install VNFM instance 114(4) at site 112(3) and VNFM instance 114(6) at site 112(4). The additional VNFM instance 114 deployments may be based at least in part on the policy 124.

In Step 4 of FIG. 1B, VNFM instance 114(1) may manage and/or monitor VNF instances 116, such as VNF instance 116(8) and VNF instance 116(9) at site 112(7), which does not have a local VNFM instance 114, in this example. Similarly, other VNFM instances 114 may participate in the VNFM network by managing and/or monitoring VNF instances 116. For example, VNFM instance 114(4) may manage VNF instance 116(1) and VNF instance 116(2) at site 112(3), while VNFM instance 114(5) manages VNF instance 116(3) at site 112(4).

In Step 5 of FIG. 1C, the virtual network may continue to be built out, similar to Step 3. For example, VNFM instance 114(2) may install VNFM instance 114(7) at site 112(5).

In Step 6 of FIG. 1C, VNFM instance 114(7) may manage VNF instance 116(4) and VNF instance 116(5) at site 112(5), and also VNF instance 116(6) and VNF instance 116(7) at site 112(6).

In Step 7 of FIG. 1C, VNFM instance 114(7) may install VNFM instance 114(3) at site 112(2). Installation of VNFM instance 114(3) at site 112(2) may be in response to an event and/or monitoring of site 112(2). For example, VNFM instance 114(2) may failed in general, may be failing to satisfy policy 124, and/or may be expected to fail in some way in the near future. The VNFM network may respond by having VNFM instance 114(7) install VNFM instance 114

(3) as a backup at site 112(2). The VNFM network may also attempt to heal VNFM instance 114(2) before installing VNFM instance 114(3), etc.

Figure 2:
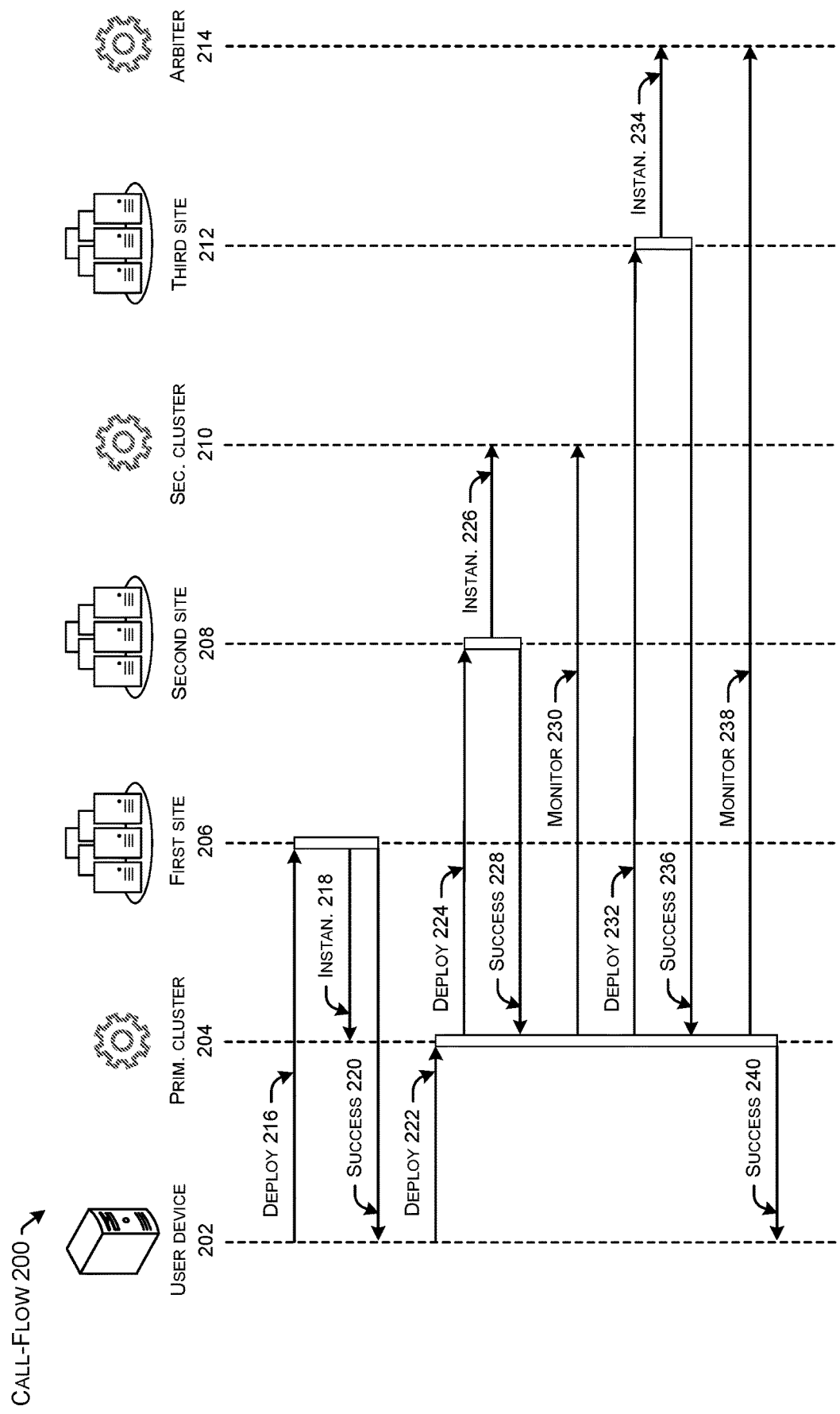
FIGS. 2, 4, 6A and 6B illustrate call flow diagrams for the use of virtual network LCM techniques as a part of communications among network and/or virtual devices, in accordance with the present concepts.

FIG. 2 depicts an example call-flow 200, including example communications between a user device 202 and/or elements of a virtual network. FIG. 2 may illustrate an example installation of a VNFM network for managing a virtual network. In this example, the virtual network may include primary cluster 204 (e.g., VNFM), first site 206, second site 208, secondary cluster 210, third site 212, and an arbiter 214 (e.g., arbiter node). In FIG. 2, primary cluster 204 may be viewed as located at first site 206, secondary cluster 210 may be located at second site 208, and arbiter 214 may be located at third site 212. Some aspects of the example shown in FIG. 2 may be similar to aspects of FIGS. 1A-1C, therefore not all elements will be described in detail.

At 216 in FIG. 2, user device 202 may deploy an initial instance of a VNFM to first site 206. The deployment at 216 may include transfer of the VNFM software from user device 202 to first site 206, transfer of one or more policies that are relevant to the desired VNFM network, instructions to install the VNFM network, etc. The deployment at 216 may specifically refer to deployment of an initial VNFM instance or deployment of a primary cluster in particular. For instance, the deployment may designate the VNFM instance as being the primary cluster VNFM instance, or include other particular instruction relative to controlling, managing, and/or beginning the VNFM network installation.

At 218, first site 206 may instantiate primary cluster 204.

At 220, following successful installation of primary cluster 204, first site 206 may reply to user device 202 to indicate that the installation was successful.

At 222, user device 202 may deploy secondary cluster 210 and/or arbiter 214. Note that once primary cluster 204 is established at first site 206, user device 202 may communicate with primary cluster 204 for the deployment of secondary cluster 210 and/or arbiter 214. Deployment of secondary cluster 210 and/or arbiter 214 may include sending instruction to primary cluster 204 to proceed with the build out of the VNFM network, transferring files related to the secondary cluster 210 and/or arbiter 214, etc. Additionally or alternatively, at 222, deployment of secondary cluster 210 and/or arbiter 214 may simply refer to sending the policy that prescribes the VNFM network design to primary cluster 204, and allowing primary cluster 204 to determine how to proceed with designing the VNFM network, including the deployment of the secondary cluster 210 and/or arbiter 214.

At 224, primary cluster 204 may deploy information regarding secondary cluster 210 to second site 208. The information may simply be a copy of files or other information associated with primary cluster 204. Thus, in some examples, secondary cluster 210 may act as a backup of primary cluster 204.

At 226, second site 208 may instantiate secondary cluster 210.

At 228, following successful installation of secondary cluster 210, second site 208 may reply to primary cluster 204 to indicate that the installation was successful.

At 230, primary cluster 204 may apply a monitor toward secondary cluster 210. The monitor may collect metrics or other information from secondary cluster 210 that may be used to evaluate performance or operation of secondary cluster 210, for example.

At 232, 234, 236, and 238, primary cluster 204 may install arbiter 214 at third site 212 and establish monitoring for arbiter 214, similar to the operations for installing and monitoring secondary cluster 210 at second site 208 (at 224, 226, 228, and 230). As used herein, an arbiter may perform election tiebreaking functions. For instance, in an example where an election may be needed to establish a new primary cluster, and the current number of cluster is an even number, an arbiter may be needed to settle the election. The arbiter may or may not be involved with other VNFM functionality.

At 240, primary cluster 204 may report other information to user device 202, such as the successful installation of secondary cluster 210 and/or arbiter 214. However, note that following the successful installation of primary cluster 204, further involvement by a user at user device 202 was not needed for the build out of the three-site VNFM network in this example. The user was only involved in the initial installation of primary cluster 204 at one of the three sites.

Figure 3A:
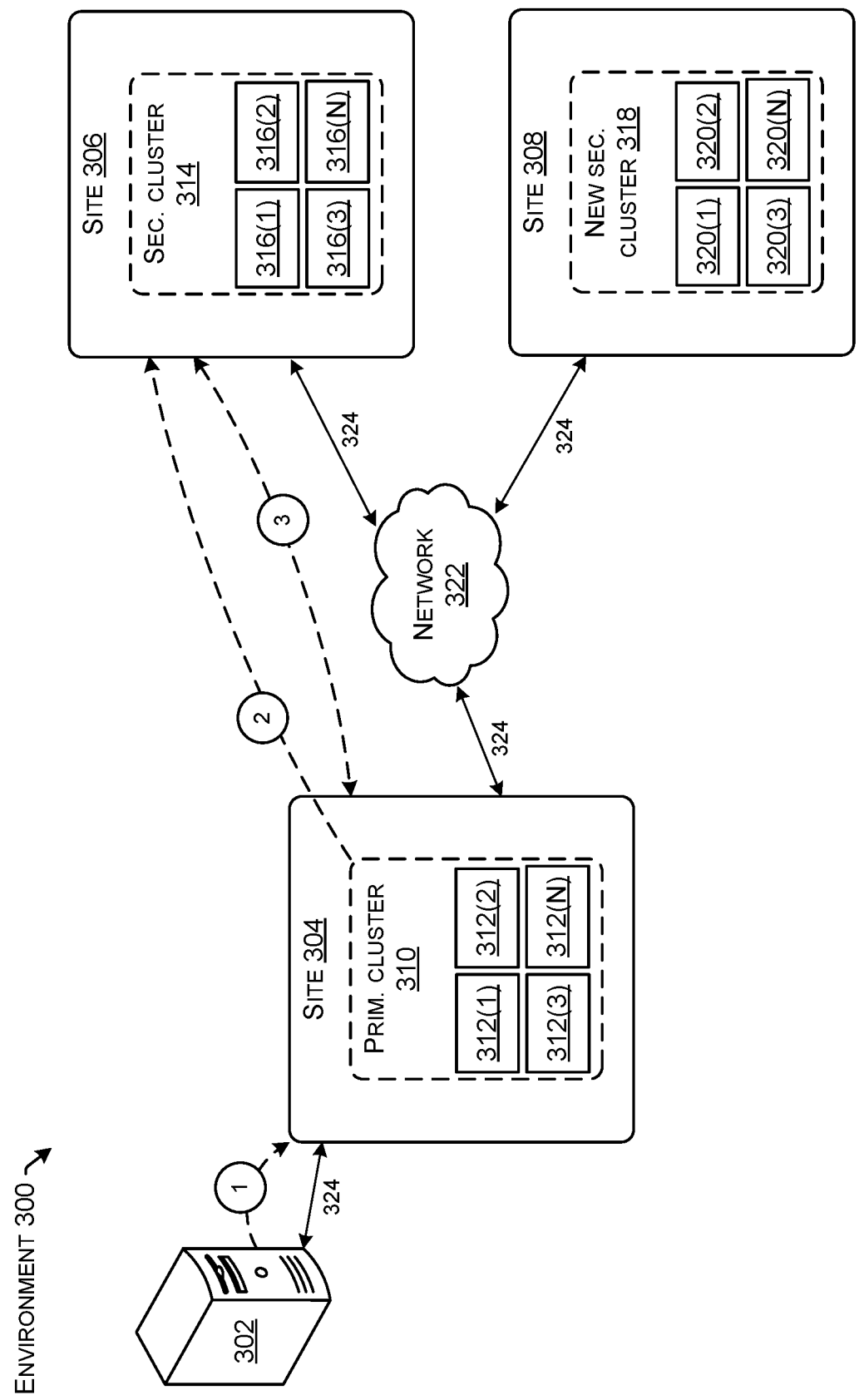
Figure 3B:
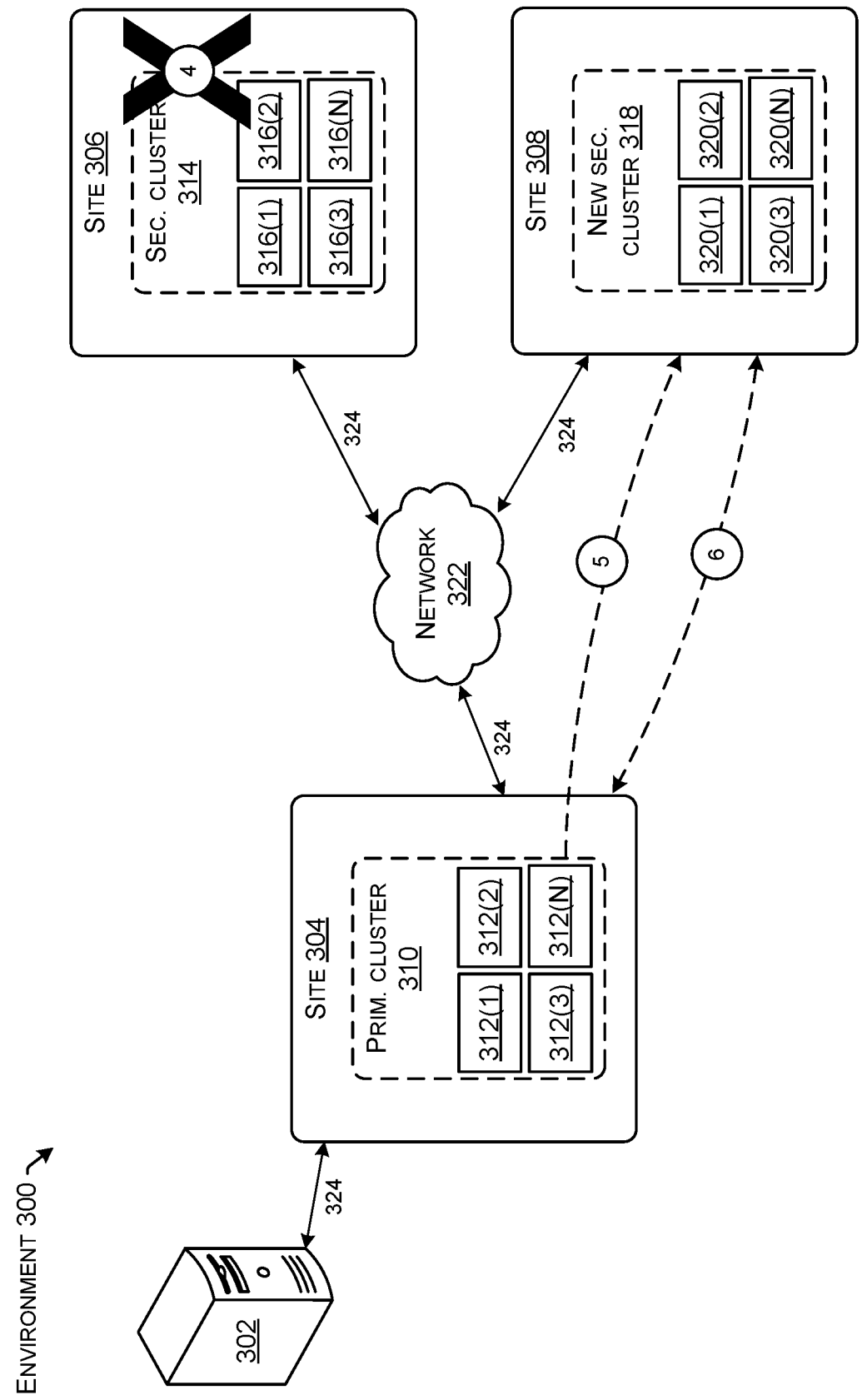

FIGS. 3A and 3B collectively illustrate an example environment 300 in accordance with the present virtual network LCM concepts. Example environment 300 may include a user device 302, which may be associated with a user (e.g., operator, administrator, network service orchestrator, etc.). Environment 300 also includes various elements that may be viewed as belonging to a virtual network, including site 304, site 306, and site 308. Site 304 may include a primary cluster 310, including one or more VNFM instances 312. Four VNFM instances 312 are shown in the primary cluster 310, including VNFM instances 312(1), 312(2), 312(3), and 312(N), where the "N" indicates that any number of VNFM instances may be included in the primary cluster 310. Similarly, site 306 may include a secondary cluster 314, including one or more VNFM instances 316, and site 308 may include a new secondary cluster 318, including one or more VNFM instances 320. Some aspects of the example shown in FIGS. 3A and 3B may be similar to aspects of FIGS. 1A-2, therefore not all elements will be described in detail.

The elements of the virtual network in example environment 300 may be connected by one or more networks, such as network 322 and/or another network(s). Within the example environment 300, user device 302, the virtual machines at sites 304, 306, and 308 that hold the VNFM instances 312, 116, and 320, and/or other devices may exchange communications (e.g., packets) via a network connection(s), some examples of which are indicated by arrows 324. Not all potential networks and/or network connections are shown in FIGS. 3A and 3B to avoid clutter on the drawing pages.

In FIGS. 3A and 3B, numbered circles and/or dashed arrows are used to represent Steps 1-6 of an example virtual network LCM scenario. The example scenario depicted in FIGS. 3A and 3B includes installation of a network of VNFM instances 312, 316, and 320 across multiple sites 304, 306, and 308 in accordance with the present virtual network LCM concepts. The example scenario also illustrates handling of a failure in the VNFM network in accordance with the present virtual network LCM concepts.

In Step 1 of FIG. 3A, at user at user device 302 interacts with site 304 by installing a primary cluster 310 at site 304, including VNFM instances 312(1), 312(2), 312(3), and 312(N).

In Step 2 of FIG. 3A, primary cluster 310 at site 304 installs a secondary cluster 314 at site 306, including VNFM instances 316(1), 316(2), 316(3), and 316(N). In some examples, any of the VNFM instances 312(1), 312(2), 312(3), and 312(N) at site 304 may participate in the installation of secondary cluster 314 at site 306.

In Step 3 of FIG. 3A, monitoring is performed between primary cluster 310 at site 304 and secondary cluster 314 at site 306. Stated another way, a monitor at a virtual machine at site 304 may be used to collect data related to one or more performance metrics of secondary cluster 314. Also, a monitor at a virtual machine at site 306 may be used to collect data related to one or more performance metrics of primary cluster 310. The metrics may be used to assess whether primary cluster 310 and/or secondary cluster 314 are performing adequately, complying with a policy, failing, expected to fail, expected to underperform with respect to a policy, etc.

In Step 4 of FIG. 3B, secondary cluster 314 has experience a failure, indicated by the "X." As used herein, failure may indicate a variety of issues, including the secondary cluster 314 no longer functioning, no longer functioning adequately (satisfying a policy), expected to fail in the near future (e.g., having a relatively high likelihood of failure in a relatively short time frame), etc. In some examples, the failure at secondary cluster 314 may have been discovered by the monitoring performed by primary cluster 310 (Step 3 of FIG. 3A).

In Step 5 of FIG. 3B, primary cluster 310 at site 304 installs a new secondary cluster 318 at site 308, including VNFM instances 320(1), 320(2), 320(3), and 320(N). The installation of new secondary cluster 318 at site 308 may be in response to the failure of secondary cluster 314 and/or in response to the detection of the failure by primary cluster 310. A VNFM instance 312 at primary cluster 310 may determine that a new secondary cluster is warranted, based on monitoring for instance, and may initiate the installation. In some examples, VNFM instances 320(1), 320(2), 320(3), and 320(N) may have already been installed at site 308 as part of the overall VNFM network, and the existing VNFM instances 320(1), 320(2), 320(3), and 320(N) may be designated by a VNFM instance 312 at primary cluster 310 as the new secondary cluster 318 in response to the failure of secondary cluster 314. The establishment of new secondary cluster 318 may be viewed as a redesign of the VNFM network in response to a failure or other potential problem. The redesign may be intended to ensure that the VNFM network continues to meet a policy goal and/or continues to provide HA in association with a service.

In Step 6 of FIG. 3B, monitoring is performed between primary cluster 310 at site 304 and new secondary cluster 318 at site 308.

Note that in the scenario depicted in FIGS. 3A and 3B, the response to the failure at secondary cluster 314 was performed without input from a user, such as at user device 302. The VNFM network at sites 304, 306, and 308 was able to perform such functions as building out the VNFM network (e.g., installing new VNFM instances), monitoring the performance of the VNFM network, detecting a failure (or other issue), and resolving the potential problem. The resolution in this instance was a redesign of the VNFM network, including establishing new secondary cluster 318. Therefore, the scenario provides an example of a self-designing, self-monitoring, self-healing, and generally self-sustaining VNFM network.

Figure 4:
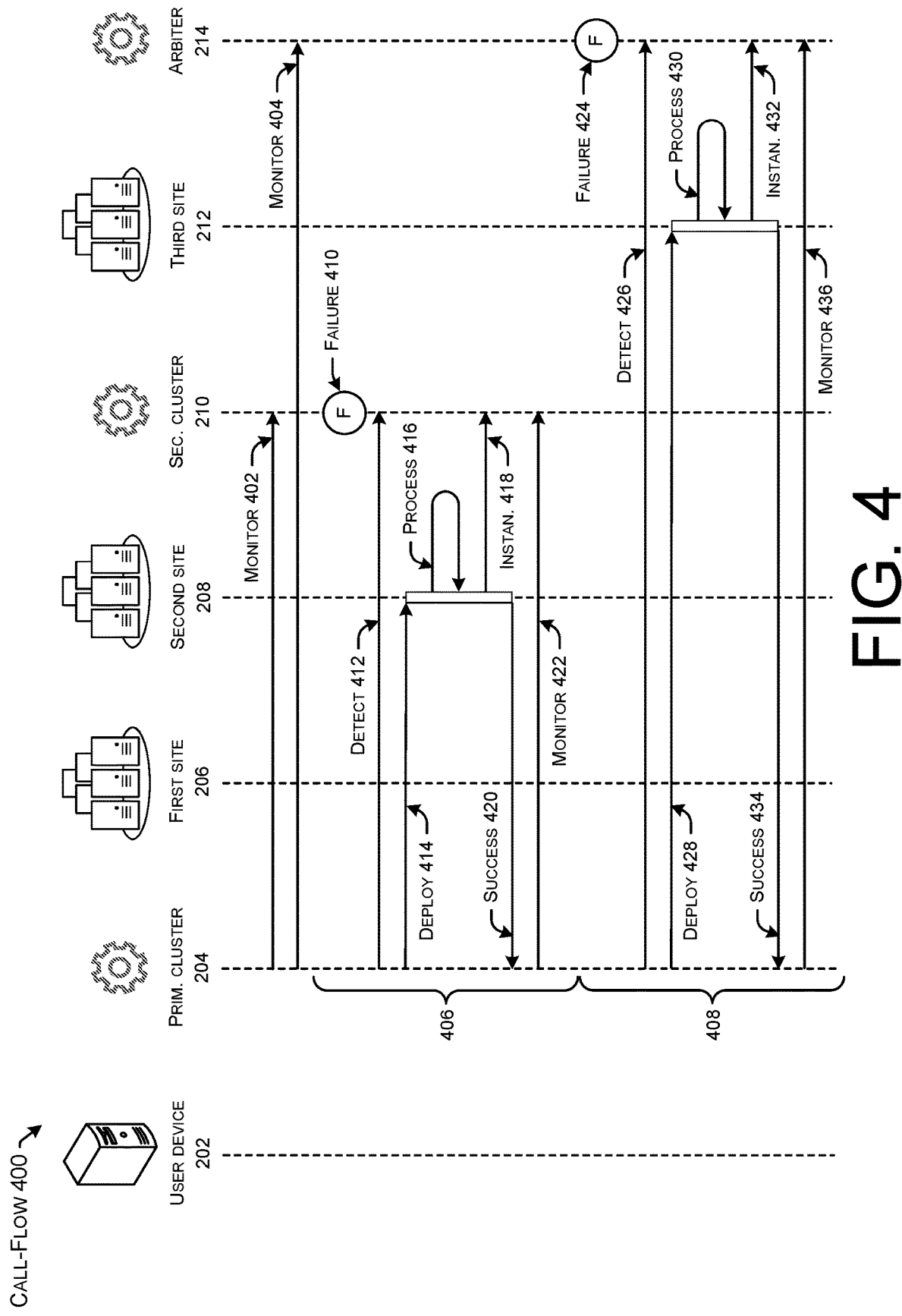

FIG. 4 depicts an example call-flow 400. FIG. 4 includes elements first introduced in FIG. 2, such as user device 202, primary cluster 204 located at first site 206, secondary cluster 210 located at second site 208, and arbiter 214 located at third site 212. Some aspects of the example shown in FIG. 4 may be similar to examples described above, therefore not all elements will be described in detail. FIG. 4 may illustrate an example of the ongoing monitoring and/or management of a virtual network by a VNFM network after an initial design, build-out, and/or installation process has occurred. For instance, example call-flow 400 may include scenarios that occur after the example described relative to FIG. 2. Note that user device 202 is not involved in example call-flow 400.

At 402 in FIG. 4, primary cluster 204 may participate in ongoing monitoring of secondary cluster 210. Similarly, at 404, primary cluster 204 may participate in ongoing monitoring of arbiter 214. The example call-flow includes two scenarios, designated 406 and 408, that may result from the monitoring.

At 410 in FIG. 4, in scenario 406, secondary cluster 210 may experience a failure or otherwise exhibit a metric that is indicative of inadequate performance.

At 412, the monitoring at 402 may detect the failure at 410.

At 414, in response to the detecting at 412, primary cluster 204 may attempt to resolve the failure by redeploying, or "healing," secondary cluster 210.

At 416, processing at second site 208 may include aspects of the healing process, such as uninstalling a faulty VNFM, determining whether a particular virtual machine the second site 208 is experiencing a failure, etc.

At 418, second site 208 may instantiate secondary cluster 210.

At 420, following successful installation of secondary cluster 210, second site 208 may reply to primary cluster 204 to indicate that the installation was successful.

At 422, primary cluster 204 may once again monitor secondary cluster 210. Therefore, in scenario 406, primary cluster 204 was successfully able to heal a failure at secondary cluster 210, without user involvement in this case. Stated another way, primary cluster 204 at first site 206 may apply application-level monitoring to VNFM software running at other sites, such as second site 208. A VNFM instance of primary cluster 204 may interact with VIM APIs at the other sites to "heal" other VNFM software instances upon failure.

In some examples, scenario 408 may be similar to scenario 406, except in scenario 408, primary cluster 210 addresses a failure 424 at arbiter 214. In scenario 408, at 426, the monitoring at 404 may detect the failure at 424. At 428, in response to the detecting at 426, primary cluster 204 may attempt to resolve the failure by redeploying, or "healing," arbiter 214. At 430, processing at third site 212 may include aspects of the healing process. At 432, third site 212 may instantiate arbiter 214. At 434, following successful installation of arbiter 214, third site 212 may reply to primary cluster 204 to indicate that the installation was successful. Finally, at 436, primary cluster 204 may once again monitor arbiter 214.

Figure 5A:
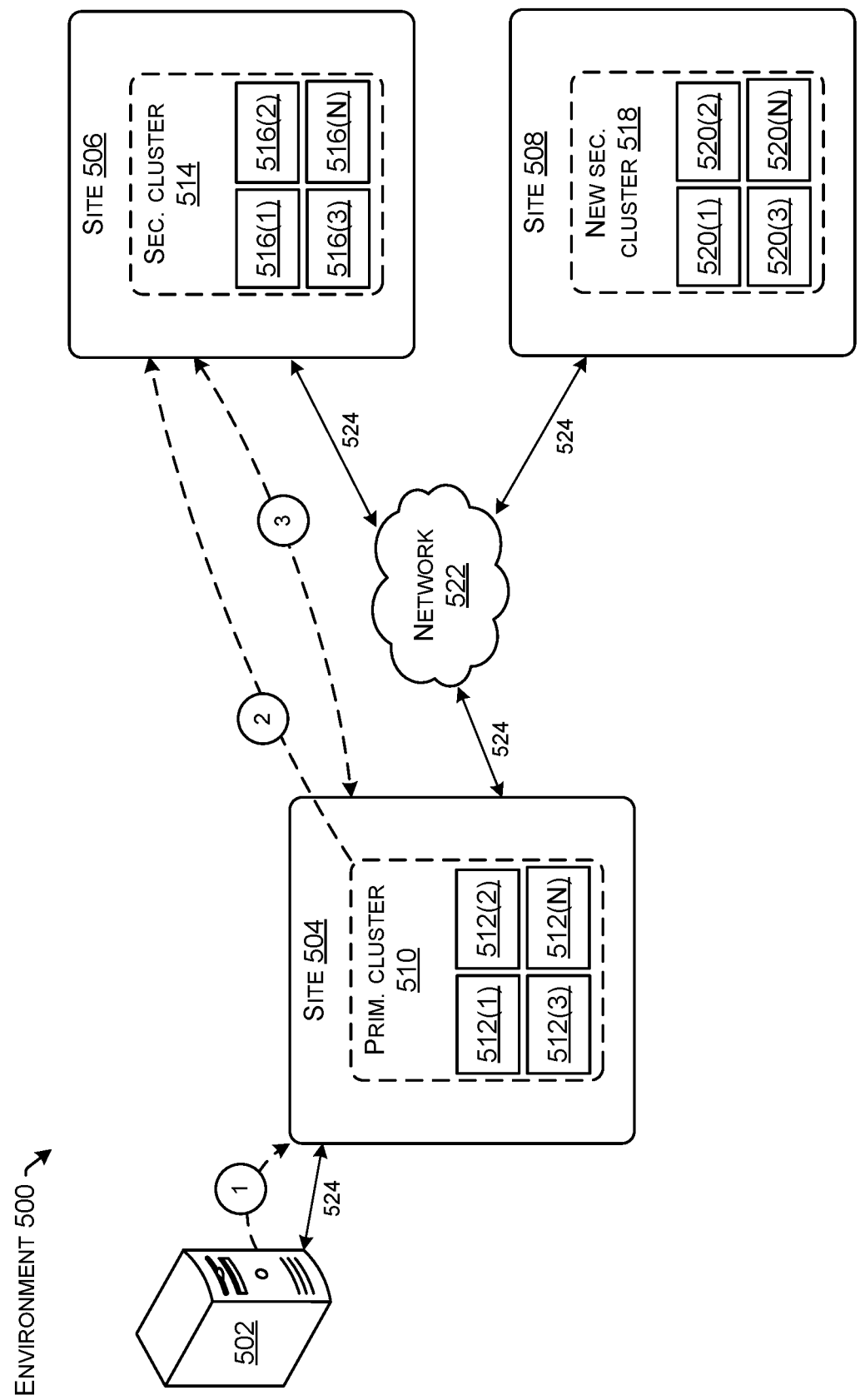
Figure 5B:
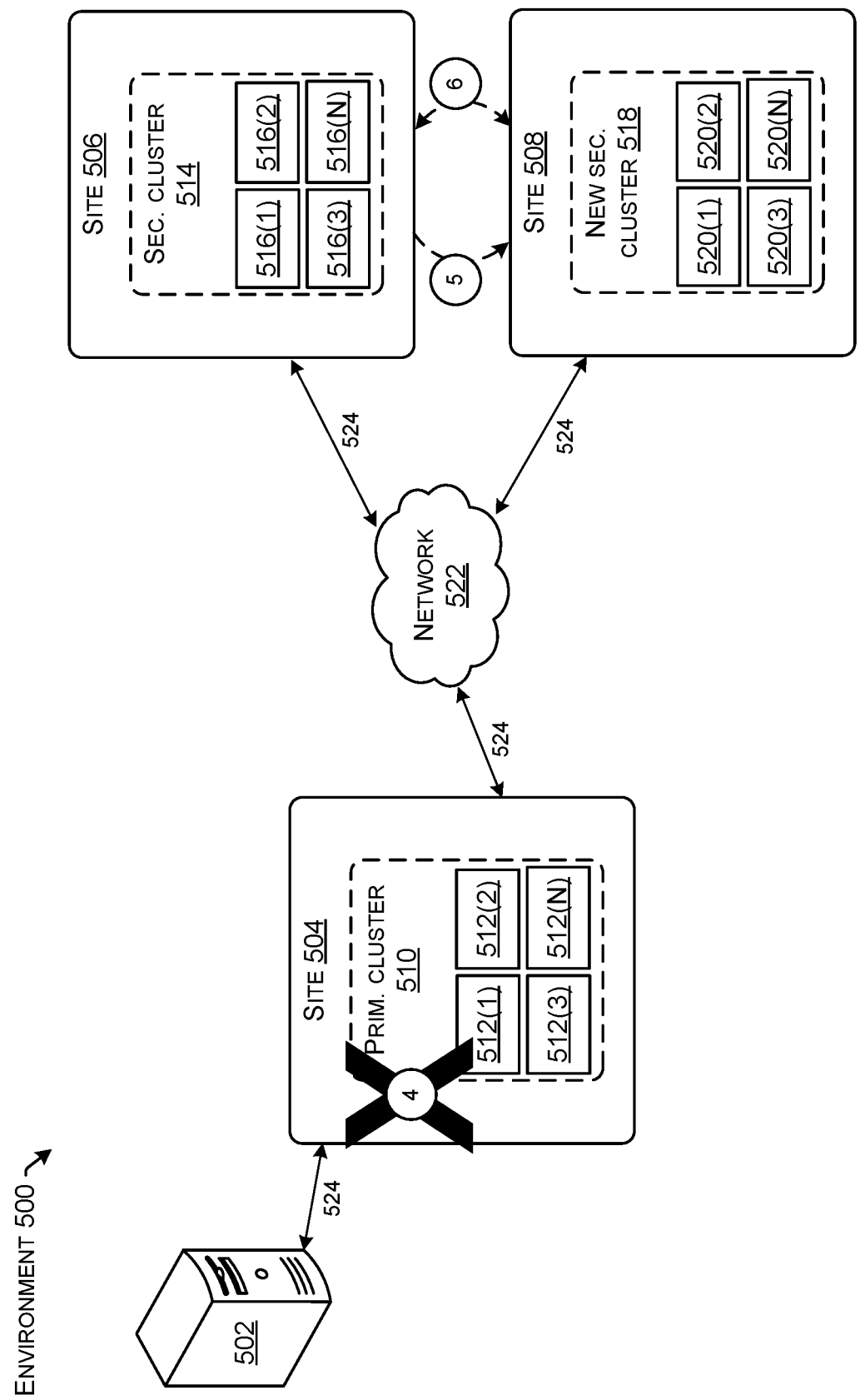

FIGS. 5A and 5B collectively illustrate an example environment 500 in accordance with the present virtual network LCM concepts. Example environment 500 may include a user device 502, which may be associated with a user (e.g., operator, administrator, network service orchestrator, etc.). Environment 500 also includes various elements that may be viewed as belonging to a virtual network, including site 504, site 506, and site 508. Site 504 may include a primary cluster 510, including one or more VNFM instances 512; a secondary cluster 514, including one or more VNFM instances 516; and a new primary cluster 518, including one or more VNFM instances 520. The elements of the virtual network in example environment 500 may be connected by one or more networks, such as network 522 and/or another network(s), and may exchange communications (e.g., packets) via a network connection(s), indicated by arrows 524. Some aspects of the example shown in FIGS. 5A and 5B may be similar to aspects of examples described above, such as relative to FIGS. 3A and 3B, therefore not all elements will be described in detail.

In FIGS. 5A and 5B, numbered circles and/or dashed arrows are used to represent Steps 1-6 of an example virtual network LCM scenario. The example scenario depicted in FIGS. 5A and 5B includes installation of a network of VNFM instances 512, 516, and 520 across multiple sites 504, 506, and 508 in accordance with the present virtual network LCM concepts. The example scenario also illustrates handling of a failure in the VNFM network in accordance with the present virtual network LCM concepts.

In Step 1 of FIG. 5A, at user at user device 502 interacts with site 504 by installing a primary cluster 510 at site 504, including VNFM instances 512(1), 512(2), 512(3), and 512(N).

In Step 2 of FIG. 5A, primary cluster 510 at site 504 installs a secondary cluster 514 at site 506, including VNFM instances 516(1), 516(2), 516(3), and 516(N).

In Step 3 of FIG. 5A, monitoring is performed between primary cluster 510 at site 504 and secondary cluster 514 at site 506. Stated another way, a monitor at a virtual machine at site 504 may be used to collect data related to one or more performance metrics of secondary cluster 514. Also, a monitor at a virtual machine at site 506 may be used to collect data related to one or more performance metrics of primary cluster 510.

In Step 4 of FIG. 5B, primary cluster 510 has experience a failure, indicated by the "X." In some examples, the failure at primary cluster 510 may have been discovered by the monitoring performed by secondary cluster 514 (Step 3 of FIG. 5A).

In Step 5 of FIG. 5B, secondary cluster 514 at site 506 may be established as an new acting primary cluster. In order to ensure a backup is available in the VNFM network, secondary cluster 514 (now functioning as a primary cluster) may then redeploy old primary cluster 510 as a new secondary cluster 518 at site 508. In this manner, the secondary cluster 514 has assumed the functions of a primary cluster, including monitoring and healing other VNFM network sites. Note that secondary cluster 514 may be equipped with all of the original information available to primary cluster 510, such as a policy associated with a service provided by the associated computing resources. Therefore, secondary cluster 514 is able to take over functioning as a primary cluster, and the VNFM network is once again shown to be self-sustaining. The VNFM functionality may be viewed as a set of VNFM instances collaborating to sustain the overall VNFM network.

In Step 6 of FIG. 5B, monitoring is performed between secondary cluster 514 (now functioning as a primary cluster) at site 506 and new secondary cluster 518 at site 508.

Figure 6A:
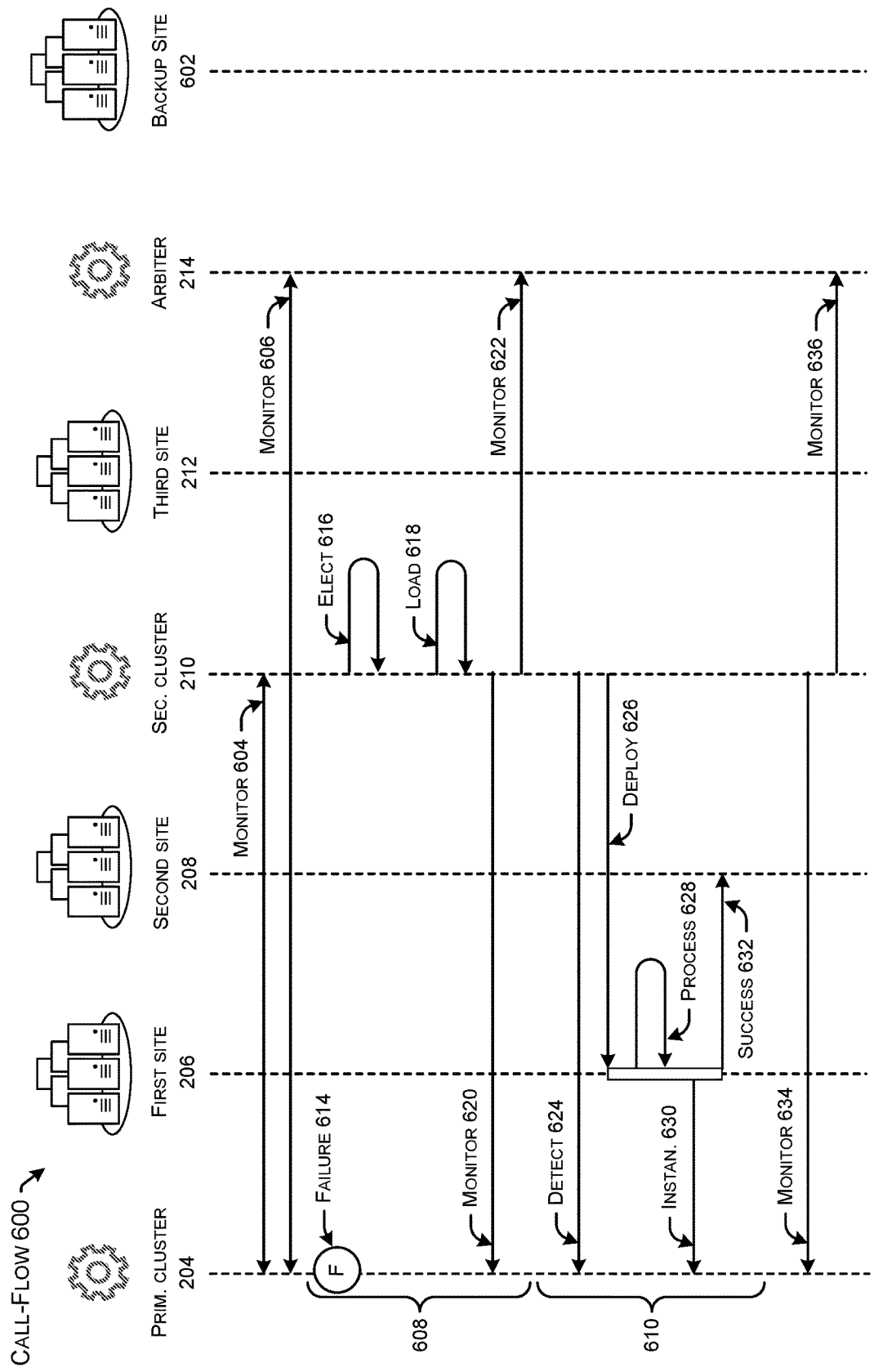
Figure 6B:
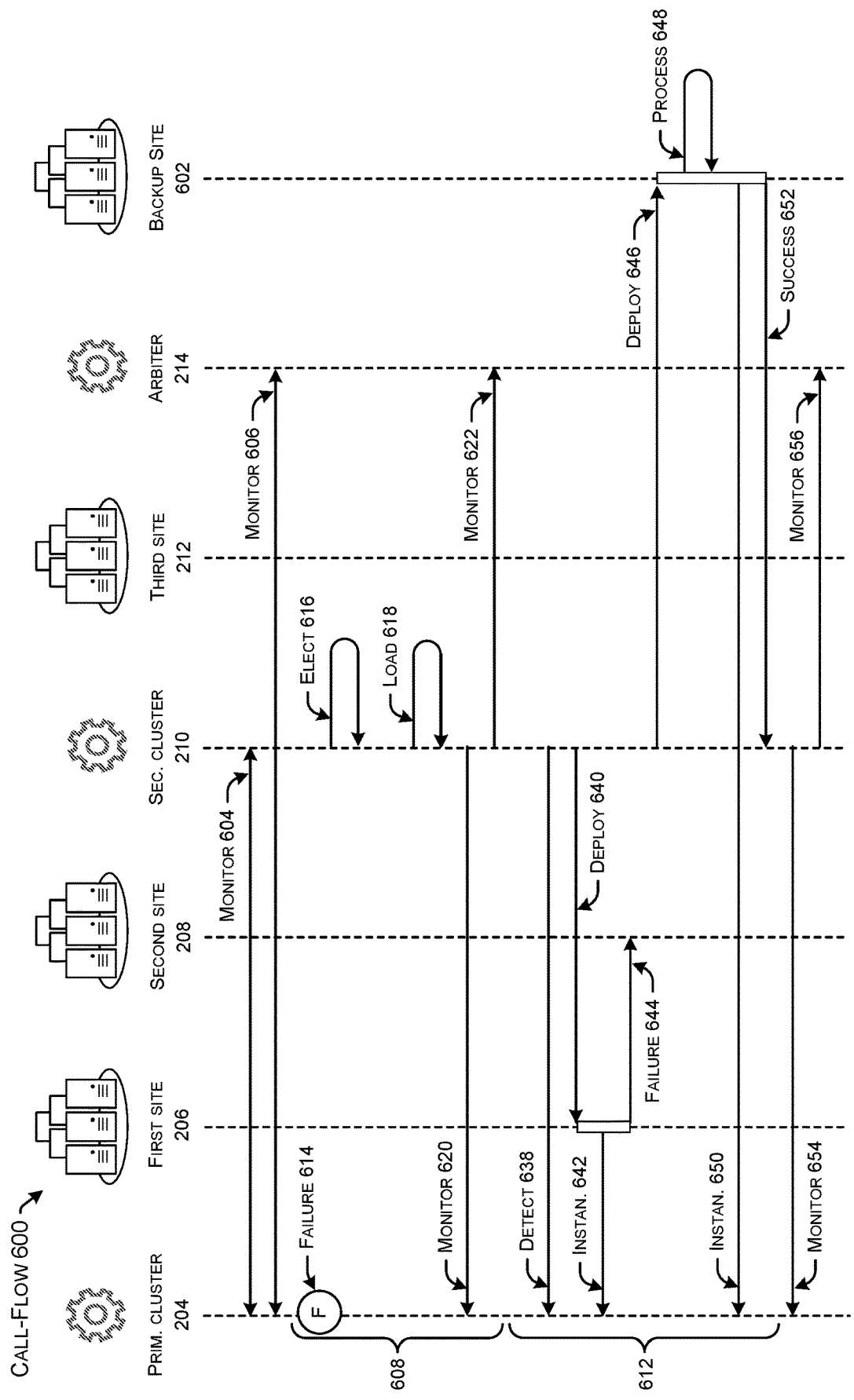

FIGS. 6A and 6B collectively show an example call-flow 600. FIGS. 6A and 6B include elements discussed above relative to FIGS. 2 and 4, such as primary cluster 204 located at first site 206, secondary cluster 210 located at second site 208, and arbiter 214 located at third site 212. FIGS. 6A and 6B also include a backup site 602. Some aspects of the example shown in FIGS. 6A and 6B may be similar to examples described above, therefore not all elements will be described in detail.

At 604 in FIGS. 6A and 6B, primary cluster 204 and secondary cluster 210 may participate in ongoing monitoring of each other. Similarly, at 606, primary cluster 204 and arbiter 214 may participate in ongoing monitoring of each other. The example call-flow 600 includes three scenarios, designated 608, 610, and 612, that may result from the monitoring. In scenario 608, a failure may occur associated with primary cluster 204. In FIG. 6A, scenario 610 represents one example outcome that may result from scenario 608. In FIG. 6B, scenario 612 represents a different example outcome that may result from scenario 608.

Returning to scenario 608, at 616 in FIG. 6A, in response to the failure of primary cluster 204 at 614, a leadership election may be triggered. In this example, secondary cluster 210 may be elected to function as a new primary cluster.

At 618, secondary cluster 210 may load the deployment of the old primary cluster in order to perform the primary cluster functions. Secondary cluster 210 may also load the deployment of the arbiter function as backup.

At 620, secondary cluster 210 (now functioning as a primary cluster) may apply a monitor toward primary cluster 204. At 622, secondary cluster 210 may also apply a monitor toward arbiter 214.

As noted above, scenario 610 in FIG. 6A represents an example outcome that may follow scenario 608. At 624, secondary cluster 210 may detect information related to the failure of the primary cluster 204. For instance, secondary cluster 210 may be able to gather data, metrics, or other information regarding the failure and/or generally about the operation of primary cluster 204. The information may indicate a cause of the failure, whether or not primary cluster 204 is able to be healed, etc. Based at least in part on the information, secondary cluster 210 may make a determination that an attempt will be made to heal primary cluster 204.

At 626, secondary cluster 210 may redeploy the old primary cluster information to first site 206. For instance, secondary cluster 210 may attempt to redeploy primary cluster 204 to serve as a new secondary cluster.

At 628, processing at first site 208 may include aspects of the healing process, such as uninstalling a faulty VNFM, determining whether a particular virtual machine the second site 208 is experiencing a failure, etc.

At 630, first site 208 may instantiate primary cluster 204.

At 632, following successful installation of primary cluster 204, first site 206 may reply to secondary cluster 210 to indicate that the installation was successful.

At 634, secondary cluster 204 may continue to monitor primary cluster 204.

Similarly, at 636, secondary cluster 204 may continue to monitor arbiter 214. Therefore, in scenario 610, primary cluster 204 was successfully healed by secondary cluster 210. Note that secondary cluster 210 was elected as the new acting primary cluster in scenario 608, and continues acting as a primary cluster at the end of scenario 610.

In FIG. 6B, scenario 612 represents another example outcome that may follow scenario 608. Similar to scenario 610, at 638, secondary cluster 210 may detect information related to the failure of the primary cluster 204. Secondary cluster 210 may make a determination that an attempt will be made to heal primary cluster 204. At 638, secondary cluster 210 may redeploy the old primary cluster information to first site 206. However, when first site 206 attempts to instantiate primary cluster 204 at 642, the deployment and therefore healing of primary cluster 204 may fail at 644. For instance, the original failure at 614 may have been an issue with primary cluster that is not yet resolved, such as a hardware issue at first site 206, a connectivity or power outage at site 206, or some other issue that diminishes the potential functionality or performance of primary cluster 204.

At 646, in response to the failure to heal primary cluster 204, secondary cluster 210 may deploy the old primary cluster information to backup site 602. The old primary cluster information may be backed up at backup site 602 until primary cluster 204 is able to be healed, for instance.

At 648, processing at backup site 602 may include aspects of storing the old primary cluster information at backup site 602 and/or aspects of an installation process for VNFM instances at backup site 602. Processing may also include determining whether it may be time to make a new attempt to heal primary cluster 204.

At 650, backup site 602 may instantiate primary cluster 204.

At 652, following successful installation of primary cluster 204, backup site 602 may reply to secondary cluster 210 to indicate that the installation was successful.

At 654, secondary cluster 210 may apply a monitor toward primary cluster 204. At 656, secondary cluster 210 may apply a monitor toward arbiter 214.

Additional detail is provided below regarding various example functionalities in accordance with the present virtual network LCM concepts.

Deployment VNFM functionality (e.g., 216, 224, 414, 428, 626, etc.) may be used to deploy other VNFM instances that automatically coordinate with existing VNFM instances. For example, a VNFM placement engine may be used to deploy VNFM instances across geographically distributed VIMs. Such deployment may be done according to configured policies. For example, deployments can account for physical proximity to VNFs of a specified type, virtual resource availability across available VIMs, and any other policies/preferences. The deployment can include selection of variable/best fit VNFM configuration (e.g., sizes) based on a variety of parameters, such as a number of VNFs to be monitored, types of VNFs, type of monitoring, available resources, etc. Additionally or alternatively, deployment may consider inter-VNFM instance attributes such as bandwidth, latency, network hops, etc.

Monitoring VNFM functionality (e.g., 230, 238, 402, 404, 620, 622, etc.) may be used to monitor other VNFM instances.

Healing VNFM functionality (e.g., 406, 408, 610, etc.) may be used to recover faulty VNFM instances rather than traditional HA methods. The faulty VNFM instances can be recovered according to configured policies. Example recovery policies can include, for example, reboot a VNFM instance, re-deploy the VNFM instance to another host, re-deploy the VNFM instance to another VIM and/or geo-location, re-deploy the VNFM instance with a different VNFM configuration (based on virtual resource availability, etc.), or any other recovery policy/preference.

Scaling VNFM functionality may be used to scale up or scale down a VNFM network, such as by adding, removing, resizing, and/or relocating VNFM instances. Scaling can be done automatically to dynamically adapt individual VNFM instances in a geo-distributed VNFM network, thereby potentially changing conditions in a VNF LCM processing load and available virtual resources across the network of VIMs/sites (e.g., core, edge, far-edge, public cloud).

Updating VNFM functionality may be used to upgrade VNFM instances. For example, software updates may include security patches, bug fixes, new versions, etc. Updates may be performed for a variety of reasons and/or in a variety of manners, including a/b testing, rolling upgrades across the VNFM network (e.g., until potentially all VNFM instances are upgraded, including a VNFM instance that starts the update sequence), etc.

Un-deployment VNFM functionality may be used to decommission a VNFM instance. In some examples, undeploy functionality can include controlled and/or orchestrated removal of geo-distributed VNFM instances.

In some implementations, a VNFM lifecycle stage (LCS) customization framework may be used to automate adjustments to customer-specific operating environments as VNFM instances dynamically adapt. Some examples include update DNS/load balancers, trigger SDN automation, notify OSS, etc.

Onboarding VNFM functionality may be used to support blueprints, templates, etc., for common VNFM instance topologies.

A VNFM cluster may a variety of types of infrastructures and/or architectures. Examples may include, private cloud, public cloud, VM-based, container-based, and/or hybrid infrastructures, or embedded products, such as VNFM as a component of another product.

VNFMs can provide LCM for geographically distributed VNFs over the top of various underlying types of networks. A network of VNFM instances may not necessarily have the physical/geographical constraints of, for example, a cloud native application bound to a local K8S cluster.

Figure 7:
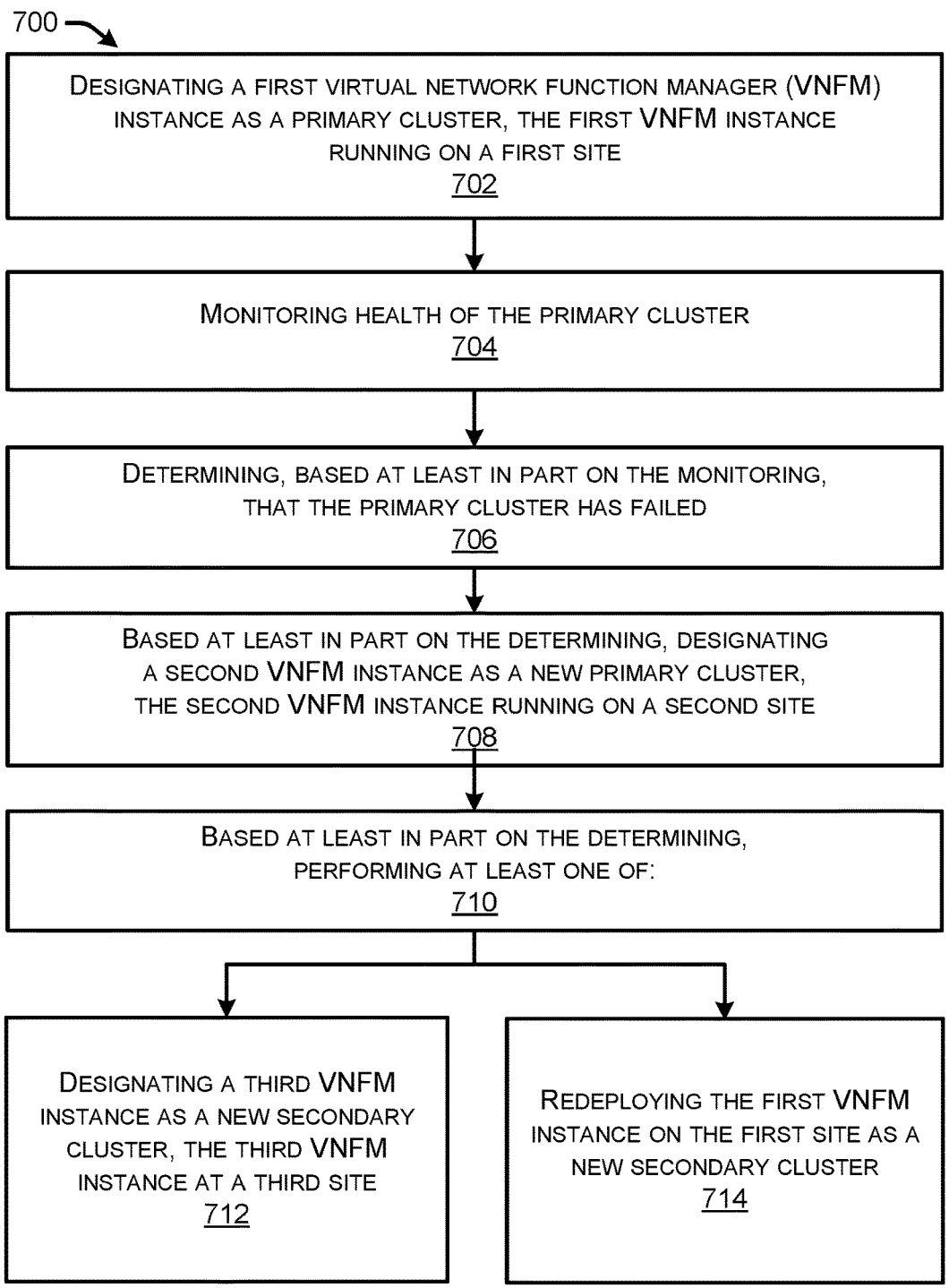
FIGS. 7 and 8 illustrate flow diagrams of example methods for the use of virtual network LCM techniques as a part of communications among network and/or virtual devices, in accordance with the present concepts.
Figure 8:
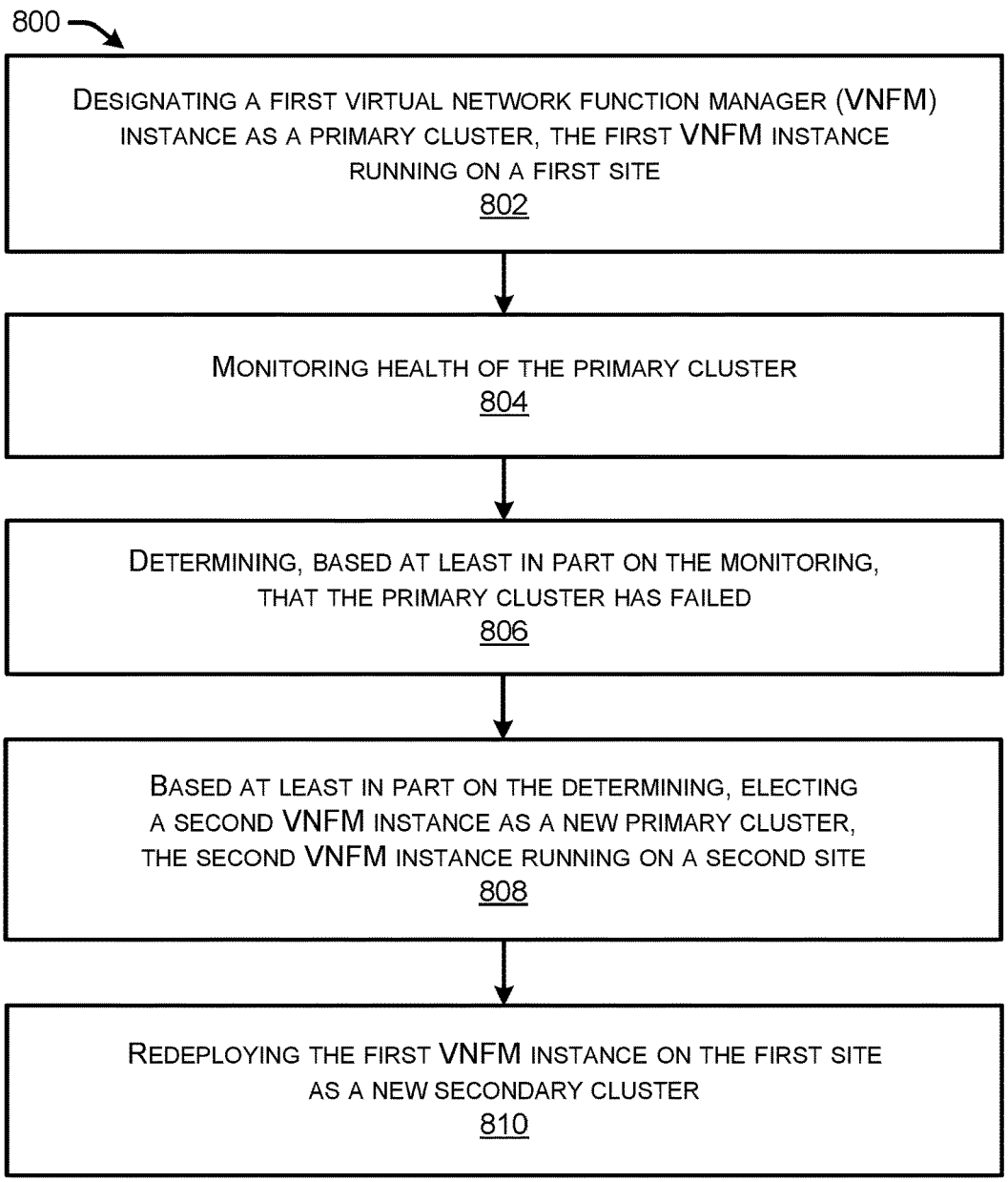

FIGS. 7 and 8 illustrate flow diagrams of example methods 700 and 800 that include functions that may be performed at least partly by a virtual computing device, such as device with a VNFM instance 114, 312, 512, etc. described relative to FIGS. 1A-6B. The logical operations described herein with respect to FIGS. 7 and 8 may be implemented (1) as a sequence of computer-implemented acts or program modules running on a computing system and/or (2) as interconnected machine logic circuits or circuit modules within the computing system.

The implementation of the various devices and/or components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations might be performed than shown in the FIGS. 7 and 8 and described herein. These operations may also be performed in parallel, or in a different order than those described herein. Some or all of these operations may also be performed by components other than those specifically identified. Although the techniques described in this disclosure is with reference to specific devices, in other examples, the techniques may be implemented by less devices, more devices, different devices, or any configuration of devices and/or components.

FIG. 7 illustrates a flow diagram of an example method 700 for a VNFM instance to perform virtual network LCM techniques. Method 700 may be performed by a VNFM instance located on a virtual computing device communicatively coupled to one or more computing resources (e.g., virtual computing devices at sites 112), for instance. In some examples, method 700 may be performed by a computing device comprising one or more processors and one or more non-transitory computer-readable media storing computer-executable instructions that, when executed by the one or more processors, cause the one or more processors to perform method 700.

At 702, method 700 may include designating a first virtual network function manager (VNFM) instance as a primary cluster. The first VNFM instance may be running on a first site, such as a first site in a cloud computing network. In some examples, method 700 may also include receiving, at the first VNFM, a policy regarding management of a virtual network function (VNF) network. The policy may designate performance parameters of the VNF network, desired metrics for the VNF network, design parameters for the VNF network and/or the VNFM network, etc.

At 704, method 700 may include monitoring health of the primary cluster. In some examples, monitoring the health of the primary cluster may include monitoring whether performance metrics of the VNF network and/or the VNFM network are meeting the policy.

At 706, based at least in part on the monitoring, method 700 may include determining that the primary cluster has failed. In some examples, determining that the primary cluster has failed may be based at least in part on the policy. Determining that the primary cluster has failed may comprises determining that the primary cluster has already failed, or simply that there is a relatively high likelihood that the primary cluster will fail in the near future, which may interrupt service provided by the VNF network.

Method 700 may also include one or more of the relevant VNFM instances participating in an election regarding the new primary cluster. The election may include participation from an arbiter node in some instances, such as where a tiebreaker is needed to resolve the election outcome. In some examples, designating the second VNFM instance as the new primary cluster may be based at least in part on the election. For instance, the second VNFM instance may have been elected as the new primary cluster by the VNFM network.

At 708, based at least in part on the determining, method 700 may include designating a second VNFM instance as a new primary cluster. In some examples, the second VNFM instance may be running on a second site. Method 700 may further include monitoring health of the new primary cluster on the second site.

At 710, based at least in part on the determining, method 700 may include performing a variety of actions. One example action may include, at 712, designating a third VNFM instance as a new secondary cluster. In this example, the third VNFM instance may be running on a third site. At 714, method 700 may include a second example action, redeploying the first VNFM instance on the first site as a new secondary cluster.

FIG. 8 illustrates a flow diagram of an example method 800 for a VNFM instance to perform virtual network LCM techniques. Method 800 may be performed by a VNFM instance located on a virtual computing device communicatively coupled to one or more computing resources (e.g., virtual computing devices at sites 112), for instance. In some examples, method 800 may be performed by a computing device comprising one or more processors and one or more non-transitory computer-readable media storing computer-executable instructions that, when executed by the one or more processors, cause the one or more processors to perform method 800.

At 802, method 800 may include designating a first virtual network function manager (VNFM) instance as a primary cluster. The first VNFM instance may be running on a first site, such as a first site in a cloud computing network. Method 800 may also include receiving, at the first VNFM instance, a policy regarding a VNFM network, where the VNFM network includes at least the first VNFM instance and the second VNFM instance.

At 804, method 800 may include monitoring health of the primary cluster.

At 806, based at least in part on the monitoring, method 800 may include determining that the primary cluster has failed. Determining that the primary cluster has failed may be based at least in part on the policy, for instance. Based at least in part on determining that the primary cluster has failed, method 800 may also include healing the first VNFM instance running on the first site.

At 808, based at least in part on the determining, method 800 may include electing a second VNFM instance as a new primary cluster. In some examples, the second VNFM instance may be running on a second site. Electing the second VNFM instance as the new primary cluster may be based at least in part on the policy, for instance.

At 810, method 800 may include redeploying the first VNFM instance on the first site as a new secondary cluster. In some examples, the redeployment of the first VNFM instance on the first site may fail. In response to such a failure, method 800 may include deploying the first VNFM instance on a third site as a new secondary cluster.

Method 800 may also include deploying the first VNFM instance on a backup site. In some examples, redeployment of the first VNFM instance on the first site may comprises instantiating the first VNFM instance from the backup site.

Figure 9:
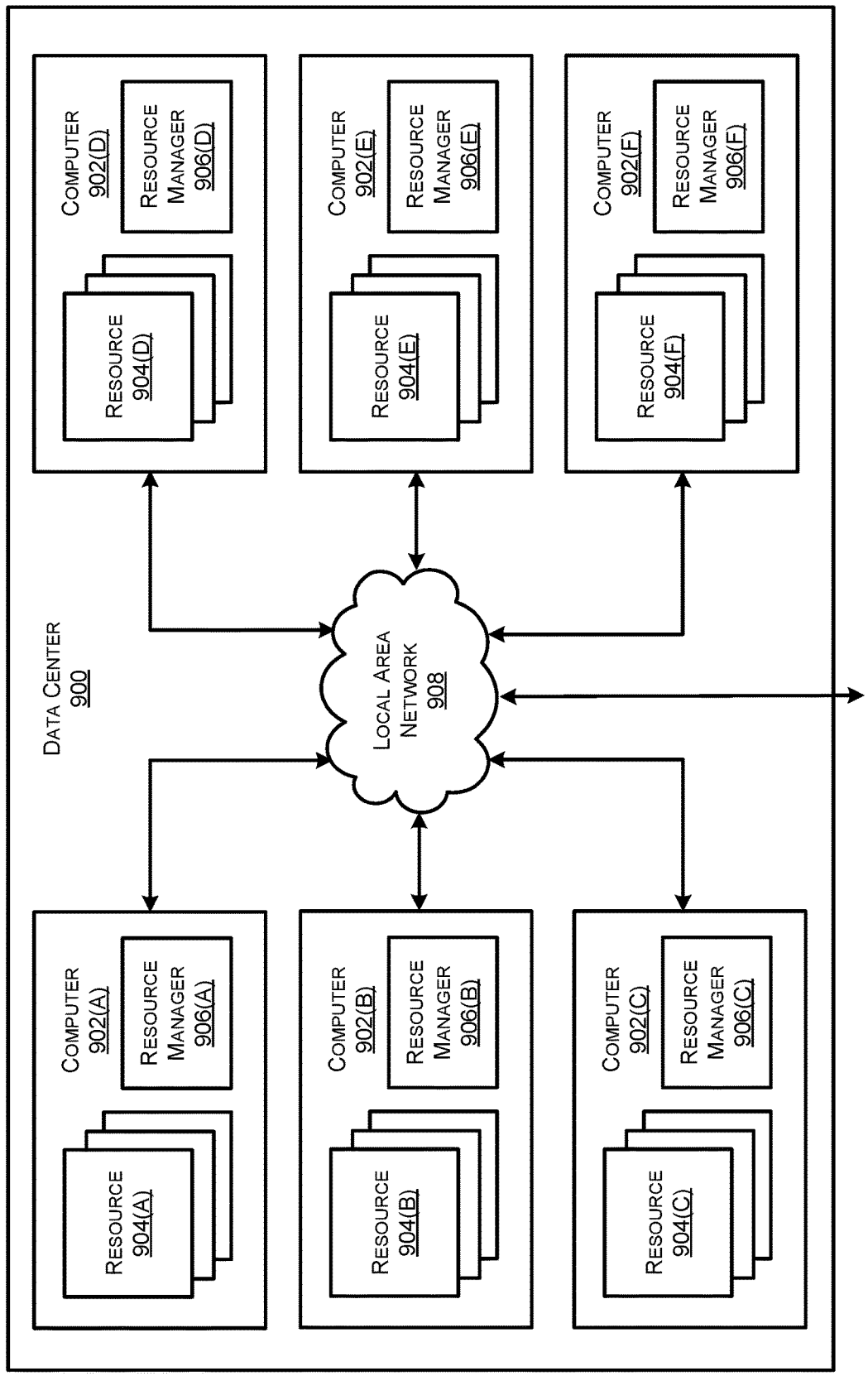
FIG. 9 illustrates a computing system diagram illustrating a configuration for a data center that can be utilized to implement aspects of the technologies disclosed herein.

FIG. 9 is a computing system diagram illustrating a configuration for a data center 900 that can be utilized to implement various aspects of the technologies disclosed herein. The example data center 900 shown in FIG. 9 includes several computers 902A-902F (which might be referred to herein singularly as "a computer 902" or in the plural as "the computers 902") for providing computing resources. In some examples, the resources and/or computers 902 may include, or correspond to, any type of networked device described herein, such as a computing device and/or virtual machine at a site 112. Although, computers 902 may comprise any type of networked device, such as servers, switches, routers, hubs, bridges, gateways, modems, repeaters, access points, hosts, etc.

The computers 902 can be standard tower, rack-mount, or blade server computers configured appropriately for providing computing resources. In some examples, the computers 902 may provide computing resources 904 including data processing resources such as virtual machine (VM) instances or hardware computing systems, VNF/CNF instances, database clusters, computing clusters, storage clusters, data storage resources, database resources, networking resources, and others. Some of the computers 902 can also be configured to execute a resource manager 906 (e.g., VNFM instance) capable of instantiating and/or managing the computing resources. In the case of VM instances, for example, the resource manager 906 can be a VNFM instance, hypervisor or another type of program configured to enable the execution of multiple VM instances on a single computer 902. Computers 902 in the data center 900 can also be configured to provide network services and other types of services.

In the example data center 900 shown in FIG. 9, an appropriate local area network (LAN) 908 is also utilized to interconnect the computers 902A-902F. It should be appreciated that the configuration and network topology described herein has been greatly simplified and that many more computing systems, software components, networks (e.g., network 322), and networking devices can be utilized to interconnect the various computing systems disclosed herein and to provide the functionality described above. Appropriate load balancing devices or other types of network infrastructure components can also be utilized for balancing a load between data centers 900, between each of the computers 902A-902F in each data center 900, and, potentially, between computing resources in each of the computers 902.

It should be appreciated that the configuration of the data center 900 described with reference to FIG. 9 is merely illustrative and that other implementations can be utilized.

In some examples, the computers 902 may each execute one or more application containers and/or virtual machines to perform techniques described herein. For instance, the containers and/or virtual machines may serve as server devices, user devices, and/or routers in the network 118, 120, 322, 522, etc.

In some instances, the data center 900 may provide computing resources, like application containers, VM instances, and storage, on a permanent or an as-needed basis. Among other types of functionality, the computing resources provided by a cloud computing network may be utilized to implement the various services and techniques described above. The computing resources 904 provided by the cloud computing network can include various types of computing resources, such as data processing resources like application containers and VM instances, data storage resources, networking resources, data communication resources, network services, and the like.

Each type of computing resource 904 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 904 not mentioned specifically herein.

The computing resources 904 provided by a cloud computing network may be enabled in one embodiment by one or more data centers 900 (which might be referred to herein singularly as "a data center 900" or in the plural as "the data centers 900"). The data centers 900 are facilities utilized to house and operate computer systems and associated components. The data centers 900 typically include redundant and backup power, communications, cooling, and security systems. The data centers 900 can also be located in geographically disparate locations. One illustrative embodiment for a data center 900 that can be utilized to implement the technologies disclosed herein will be described below relative to FIG. 10.

Figure 10:
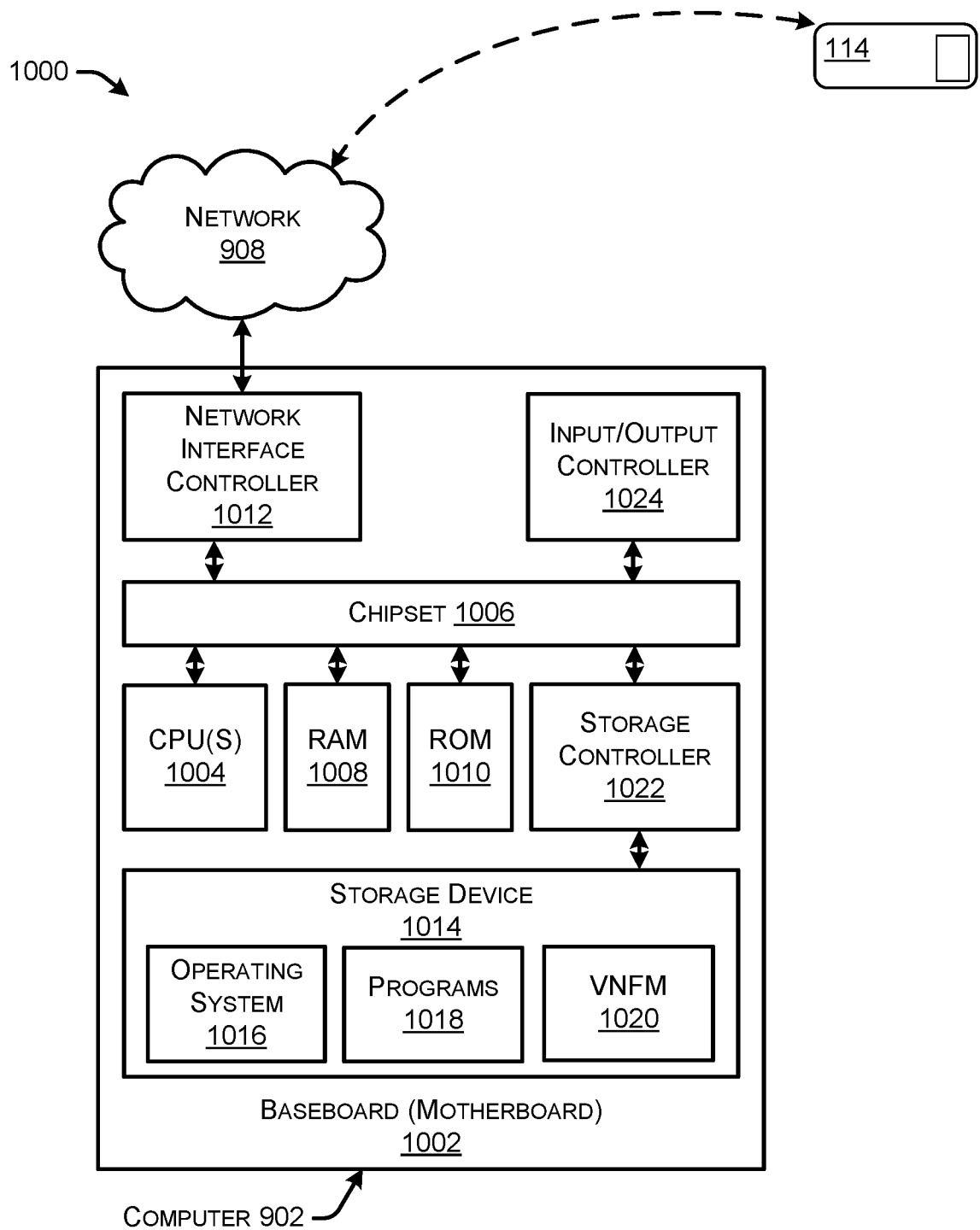
FIG. 10 is a computer architecture diagram showing an illustrative computer hardware architecture for implementing a device that can be utilized to implement aspects of the various technologies presented herein.

FIG. 10 shows an example computer architecture 1000 for a computer 902 capable of executing program components for implementing the functionality described above. The computer architecture 1000 shown in FIG. 10 illustrates a conventional server computer, workstation, user device desktop computer, laptop, tablet, network appliance, e-reader, smartphone, and/or other computing device, and can be utilized to execute any of the software components presented herein. The computer 902 may, in some examples, correspond to a physical device described herein (e.g., user device, computing device, virtual machine, etc.), and may comprise networked devices such as servers, switches, routers, hubs, bridges, gateways, modems, repeaters, access points, etc. For instance, computer 902 may correspond to a computing device and/or virtual machine at a site 112.

As shown in FIG. 10, the computer 902 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 902.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 902. The chipset 1006 can further provide an interface to a computer-readable storage medium such as a read-only memory ("ROM") 1010 or non-volatile RAM ("NVRAM") for storing basic routines that help to startup the computer 902 and to transfer information between the various components and devices. The ROM 1010 or NVRAM can also store other software components necessary for the operation of the computer 902 in accordance with the configurations described herein.

The computer 902 can operate in a networked environment using logical connections to remote computing devices and computer systems through a network, such as the networks 118, 120, 322, 522, and/or 908. The chipset 1006 can include functionality for providing network connectivity through a network interface controller (NIC) 1012, such as a gigabit Ethernet adapter. The NIC 1012 is capable of connecting the computer 902 to other computing devices over the network 908. For instance, in the example shown in FIG. 10, NIC 1012 may help facilitate transfer of data, encryption keys, packets, and/or communications, such as information related to VNFM instances or a policy, over the network 908 with a VNFM instance (e.g., VNFM instance 114). It should be appreciated that multiple NICs 1012 can be present in the computer 902, connecting the computer to other types of networks and remote computer systems.

The computer 902 can be connected to a storage device 1014 that provides non-volatile storage for the computer. The storage device 1014 can store an operating system 1016, programs 1018, VNFM information 1020, and/or other data, such as policy information. The storage device 1014 can be connected to the computer 902 through a storage controller 1022 connected to the chipset 1006, for example. The storage device 1014 can consist of one or more physical storage units. The storage controller 1022 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 902 can store data on the storage device 1014 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1014 is characterized as primary or secondary storage, and the like.

For example, the computer 902 can store information to the storage device 1014 by issuing instructions through the storage controller 1022 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 902 can further read information from the storage device 1014 by detecting the physical states or characteristics of one or more particular locations within the physical storage units.

In addition to the mass storage device 1014 described above, the computer 902 can have access to other computer-readable storage media to store and retrieve information, such as policies, program modules, data structures, and/or other data. It should be appreciated by those skilled in the art that computer-readable storage media is any available media that provides for the non-transitory storage of data and that can be accessed by the computer 902. In some examples, the operations performed by the network 908, and or any components included therein, may be supported by one or more devices similar to computer 902. Stated otherwise, some or all of the operations performed by the network 908, and or any components included therein, may be performed by one or more computer devices 902 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 1014 can store an operating system 1016 utilized to control the operation of the computer 902. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 1014 can store other system or application programs and data utilized by the computer 902.

In one embodiment, the storage device 1014 or other computer-readable storage media is encoded with computer-executable instructions which, when loaded into the computer 902, transform the computer from a general-purpose computing system into a special-purpose computer capable of implementing the embodiments described herein. These computer-executable instructions transform the computer 902 by specifying how the CPUs 1004 transition between states, as described above. According to one embodiment, the computer 902 has access to computer-readable storage media storing computer-executable instructions which, when executed by the computer 902, perform the various processes described above relative to FIGS. 1A-8. The computer 902 can also include computer-readable storage media having instructions stored thereupon for performing any of the other computer-implemented operations described herein.

The computer 902 can also include one or more input/output controllers 1024 for receiving and processing input from a number of input devices, such as a keyboard, a mouse, a touchpad, a touch screen, an electronic stylus, or other type of input device. Similarly, an input/output controller 1024 can provide output to a display, such as a computer monitor, a flat-panel display, a digital projector, a printer, or other type of output device. It will be appreciated that the computer 902 might not include all of the components shown in FIG. 10, can include other components that are not explicitly shown in FIG. 10, or might utilize an architecture completely different than that shown in FIG. 10.

As described herein, the computer 902 may comprise one or more devices, such as a computing device and/or virtual machine at a site 112, and/or other devices. The computer 902 may include one or more hardware processors 1004 (processors) configured to execute one or more stored instructions. The processor(s) 1004 may comprise one or more cores. Further, the computer 902 may include one or more network interfaces configured to provide communications between the computer 902 and other devices, such as the communications described herein as being performed by a computing device and/or virtual machine, and/or other devices. In some examples, the communications may include data, encryption keys, packets, requests, and/or other information transfer, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 1018 may comprise any type of programs or processes to perform the techniques described in this disclosure in accordance with virtual network LCM techniques. For instance, the programs 1018 may cause the computer 902 to perform techniques for communicating with other devices using any type of protocol or standard usable for determining connectivity. Additionally, the programs 1018 may comprise instructions that cause the computer 902 to perform the specific techniques for the employment of virtual network LCM concepts.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A computer-implemented method comprising:
designating a first virtual network function manager (VNFM) instance as a primary cluster, the first VNFM instance running on a first site;
monitoring health of the primary cluster;
determining, based at least in part on the monitoring, that the primary cluster has failed;
responsive to determining that the primary cluster has failed, participating in an election regarding a new primary cluster;
based at least in part on the election, designating a second VNFM instance as the new primary cluster, the second VNFM instance running on a second site.

2. The computer-implemented method of claim 1, further comprising:
receiving, at the first VNFM, a policy regarding management of a virtual network function (VNF) network,
wherein the determining that the primary cluster has failed is based at least in part on the policy.

3. The computer-implemented method of claim 2, wherein the monitoring the health of the primary cluster includes monitoring whether performance metrics of the VNF network are meeting the policy.

4. The computer-implemented method of claim 1, further comprising:
based at least in part on determining that the primary cluster has failed, perform at least one of:
designating a third VNFM instance as a new secondary cluster, the third VNFM instance running on a third site, or
redeploying the first VNFM instance on the first site as a new secondary cluster.

5. The computer-implemented method of claim 1, wherein the election includes participation from an arbiter node.

6. The computer-implemented method of claim 1, wherein the determining that the primary cluster has failed comprises determining that the primary cluster has already failed or determining that there is a relatively high likelihood that the primary cluster will fail.

7. The computer-implemented method of claim 1, further comprising:
monitoring health of the new primary cluster on the second site.

8. A computing device comprising:
one or more processors; and
one or more non-transitory computer-readable media storing computer-executable instructions that, when executed by the one or more processors, cause the one or more processors to:
designate a first virtual network function manager (VNFM) instance as a primary cluster, the first VNFM instance running on a first site;
monitor health of the primary cluster;
determine, based at least in part on the monitoring, that the primary cluster has failed;
responsive to determining that the primary cluster has failed, electing a new primary cluster;
based at least in part on the electing, designate a second VNFM instance as the new primary cluster, the second VNFM instance running on a second site.

9. The computing device of claim 8, wherein the computer-executable instructions further cause the one or more processors to:
receive, at the first VNFM, a policy regarding management of a virtual network function (VNF) network,
wherein the determining that the primary cluster has failed is based at least in part on the policy.

10. The computing device of claim 9, wherein monitoring the health of the primary cluster includes monitoring whether performance metrics of the VNF network are meeting the policy.

11. The computing device of claim 8, wherein the computer-executable instructions further cause the one or more processors to perform at least one of:
designating a third VNFM instance as a new secondary cluster, the third VNFM instance running on a third site; or
redeploying the first VNFM instance on the first site as a new secondary cluster.

12. The computing device of claim 8, wherein the electing includes participation from an arbiter node.

13. The computing device of claim 8, wherein determining that the primary cluster has failed comprises determining that the primary cluster has already failed or determining that there is a relatively high likelihood that the primary cluster will fail.

14. The computing device of claim 8, wherein the computer-executable instructions further cause the one or more processors to:
monitor health of the new primary cluster on the second site.

15. A method comprising:
designating a first virtual network function manager (VNFM) instance as a primary cluster, the first VNFM instance running on a first site;
monitoring health of the primary cluster;
determining, based at least in part on the monitoring, that the primary cluster has failed;
based at least in part on the determining, electing a second VNFM instance as a new primary cluster, the second VNFM instance running on a second site; and
redeploying the first VNFM instance on the first site as a new secondary cluster.

16. The method of claim 15, further comprising:
in an instance where the redeploying the first VNFM instance on the first site fails, deploying the first VNFM instance on a third site as a new secondary cluster.

17. The method of claim 15, further comprising:
deploying the first VNFM instance on a backup site,
wherein redeployment of the first VNFM instance on the first site comprises instantiating the first VNFM instance from the backup site.

18. The method of claim 15, further comprising:
based at least in part on the determining that the primary cluster has failed, healing the first VNFM instance running on the first site.

19. The method of claim 15, further comprising:
receiving, at the first VNFM instance, a policy regarding a VNFM network that includes the first VNFM instance and the second VNFM instance,
wherein the electing the second VNFM instance as the new primary cluster is based at least in part on the policy.

20. The method of claim 19, wherein the determining that the primary cluster has failed is based at least in part on the policy.

* * * * *